US011163296B2

(12) United States Patent
Sagasaki et al.

(10) Patent No.: US 11,163,296 B2
(45) Date of Patent: Nov. 2, 2021

(54) NUMERICAL CONTROL DEVICE AND NUMERICAL CONTROL METHOD

(71) Applicant: Mitsubishi Electric Corporation, Tokyo (JP)

(72) Inventors: Masakazu Sagasaki, Tokyo (JP); Satoru Inokuchi, Tokyo (JP); Yuki Hirata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/278,680

(22) PCT Filed: Oct. 26, 2018

(86) PCT No.: PCT/JP2018/039904
§ 371 (c)(1),
(2) Date: Mar. 23, 2021

(87) PCT Pub. No.: WO2020/084770
PCT Pub. Date: Apr. 30, 2020

(65) Prior Publication Data
US 2021/0311460 A1 Oct. 7, 2021

(51) Int. Cl.
*G05B 19/4155* (2006.01)
*B23Q 15/013* (2006.01)
*B23B 7/02* (2006.01)

(52) U.S. Cl.
CPC ........... *G05B 19/4155* (2013.01); *B23B 7/02* (2013.01); *B23Q 15/013* (2013.01); *G05B 2219/37457* (2013.01)

(58) Field of Classification Search
CPC .............................................. G05B 19/4155
(Continued)

(56) References Cited

U.S. PATENT DOCUMENTS

| 5,911,802 | A | 6/1999 | Kimura et al. |
| 11,073,497 | B2 * | 7/2021 | Arimatsu ............... B23Q 17/12 |

(Continued)

FOREIGN PATENT DOCUMENTS

| JP | 56-76357 A | 6/1981 |
| JP | 10-15701 A | 1/1998 |

(Continued)

OTHER PUBLICATIONS

International Search Report and Written Opinion dated Jan. 15, 2019, received for PCT Application PCT/JP2018/039904, Filed on Oct. 26, 2018, 11 pages including English Translation.

(Continued)

*Primary Examiner* — David Luo
(74) *Attorney, Agent, or Firm* — Xsensus LLP

(57) ABSTRACT

A numerical control device for a machine tool, the machine tool including: a reference shaft that moves a tool or a workpiece; and a superimposition shaft that moves a tool or the workpiece. The numerical control device superimposes the movement amount of the reference shaft on the movement amount of the superimposition shaft. The numerical control device including a control computation unit that, in response to a superimposition control command, changes at least one of a first vibration rate, a second vibration rate, and a main shaft rotation speed on a basis of a first vibration command, a second vibration command and a main shaft rotation speed command such that the first vibration rate stays constant and the second vibration rate stays constant. The first vibration rate is a number of times that of the reference shaft vibrates per rotation of a main shaft.

10 Claims, 21 Drawing Sheets

(58) Field of Classification Search
USPC .................................... 700/28; 318/560, 561
See application file for complete search history.

(56) References Cited

U.S. PATENT DOCUMENTS

| | | |
|---|---|---|
| 2010/0013804 A1 | 1/2010 | Chen et al. |
| 2010/0138047 A1 | 6/2010 | Bauer et al. |
| 2015/0355624 A1 | 12/2015 | Irie et al. |
| 2016/0011579 A1 | 1/2016 | Watanabe et al. |
| 2018/0243834 A1 | 8/2018 | Sannomiya et al. |

FOREIGN PATENT DOCUMENTS

| | | |
|---|---|---|
| JP | 5599523 B1 | 10/2014 |
| JP | 2015-230655 A | 12/2015 |
| WO | 2017/043499 A | 3/2017 |

OTHER PUBLICATIONS

Notice of Reasons for Refusal dated Aug. 27, 2019, received for JP Application 2019-528935, 10 pages including English Translation.
Decision to Grant dated Jan. 28, 2020, received for JP Application 2019-528935, 5 pages including English Translation.

\* cited by examiner

```
$1(REFERENCE SHAFT          $2(SUPERIMPOSITION
SIDE)                       SHAFT SIDE)
  M3 S1=1200                  .
   .                          .
   .                          .
  G0 X10. Z50. ;             G0 X5. Z60. ;
  G126 Z2=Z1 ;
  G165 A0.2 D0.5 ;           G165 A0.3 D4.5 ;
  !2 L1                      !1 L1
  G1 Z10. F0.5 ;             G1 X10. Z15. F0.5 ;
   .                          .
  !2 L2                      !1 L2
   .                          .
```

810A          810B

FEED DIRECTION OF WORKPIECE

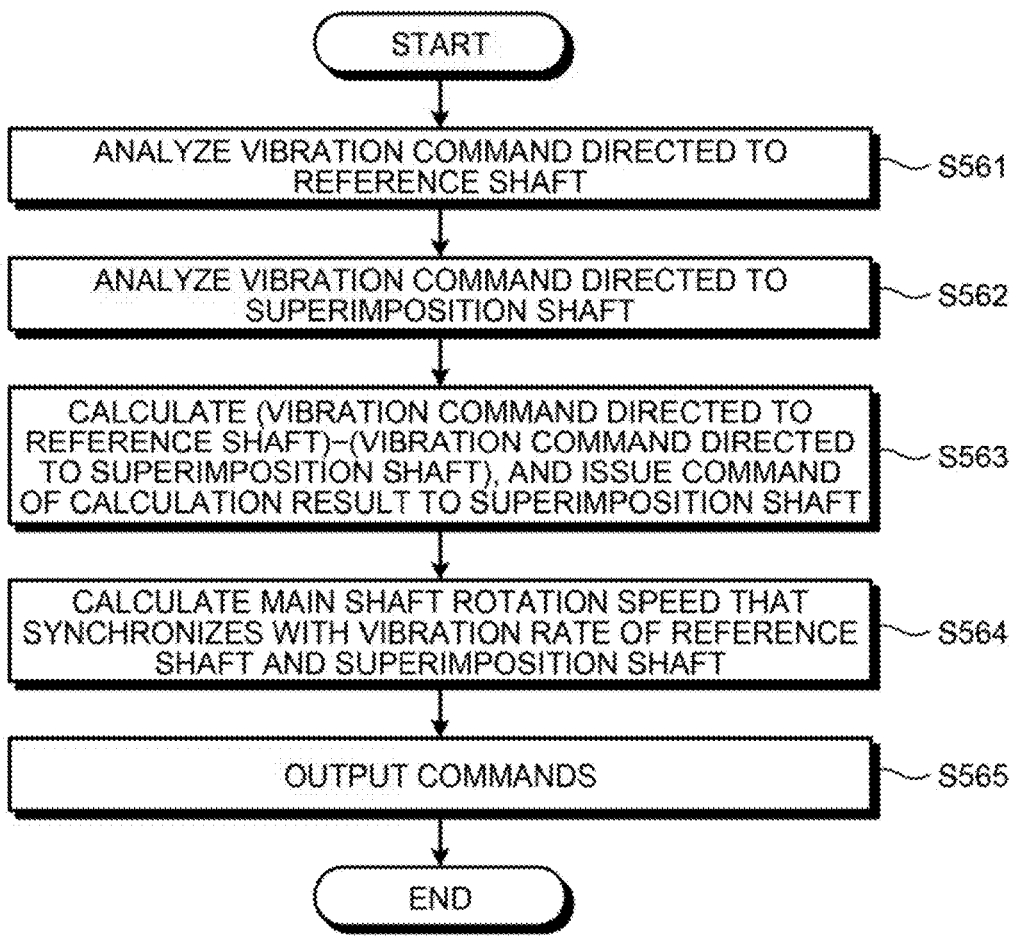

WAVEFORM OF VIBRATION COMMAND DIRECTED TO REFERENCE SHAFT

WAVEFORM OF VIBRATION COMMAND DIRECTED TO SUPERIMPOSITION SHAFT

VIBRATION COMMAND DIRECTED TO SUPERIMPOSITION SHAFT
(WAVEFORM OF VIBRATION COMMAND FOR REFERENCE SHAFT)−
(WAVEFORM OF VIBRATION COMMAND DIRECTED TO
SUPERIMPOSITION SHAFT)

FIG.32

```
$1(REFERENCE SHAFT          $2(SUPERIMPOSITION
SIDE)                       SHAFT SIDE)
  M3 S1=2000                  M3 S2=1200
  :                           :
  G0 X10. Z50. ;              G0 X5. Z60. ;
  G126 Z2=Z1 ;
  G165 A0.2 D2.5 ;            G165 A0.3 D4.5 ;
  !2 L1                       !1 L1
  G1 Z10. F0.5 ;              G1 Z15. F0.5 ;
  :                           :
  !2 L2                       !1 L2
  :                           :
```

830C              830D

~83

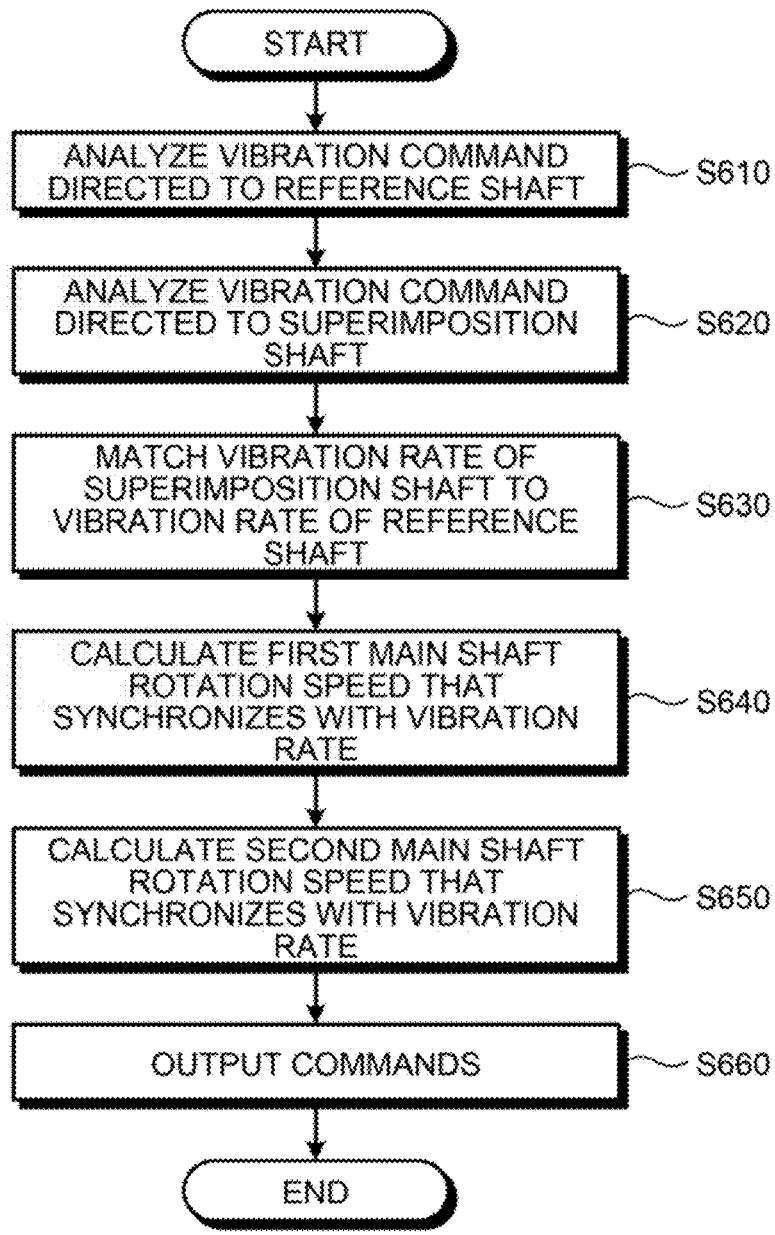

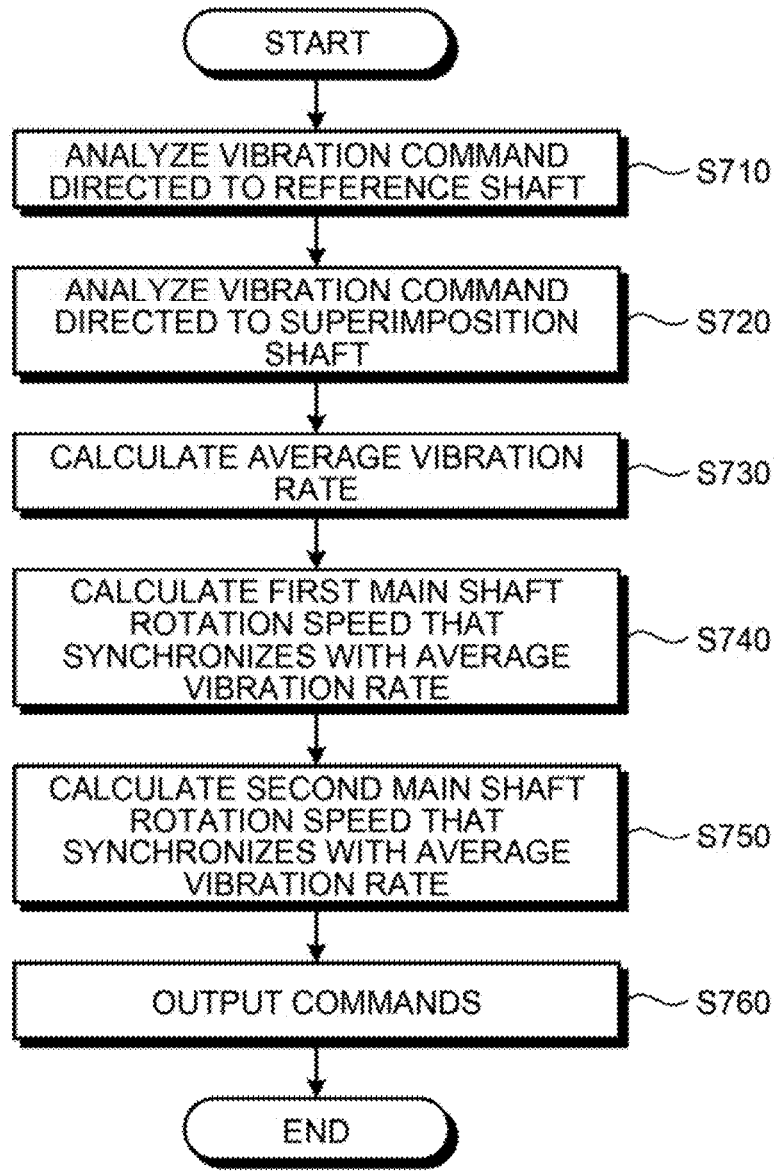
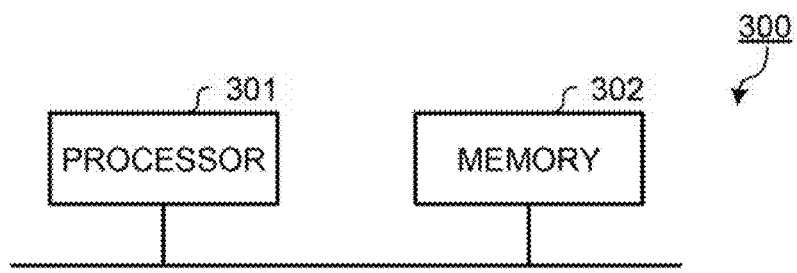

NUMERICAL CONTROL DEVICE AND NUMERICAL CONTROL METHOD

CROSS-REFERENCE TO RELATED APPLICATION

The present application is based on PCT filing PCT/JP2018/039904, filed Oct. 26, 2018, the entire contents of which are incorporated herein by reference.

FIELD

The present invention relates to a numerical control device and a numerical control method for controlling vibration cutting with a vibrating tool.

BACKGROUND

In the field of turning, numerical control devices are used to control the operation of a tool in accordance with a machining program for machining a workpiece, thereby allowing the tool to machine the workpiece. Some numerical control devices allow vibration cutting to be performed on a workpiece with a tool vibrating at a specific frequency along the tool path.

The numerical control device described in Patent Literature 1 calculates a command movement amount per unit time from a movement command directed to a tool, calculates a vibration movement amount per unit time from a vibration condition, calculates a combined movement amount by combining the command movement amount and the vibration movement amount, and controls vibration cutting on the basis of the combined movement amount.

CITATION LIST

Patent Literature

Patent Literature 1: Japanese Patent No. 5599523

SUMMARY

Technical Problem

Unfortunately, the technique described in Patent Literature 1 is not adapted for control using a reference shaft and a superimposition shaft, which control is called superimposition control. That is, if superimposition control for controlling the movement amount of one drive shaft as a reference shaft such that the movement amount of the one drive shaft is superimposed on another drive shaft as a superimposition shaft is performed in Patent Literature 1, vibration cutting cannot be performed because of failure to achieve coordination between vibration and superimposition, which is problematic.

The present invention has been made in view of the above, and an object thereof is to obtain a numerical control device that enables execution of vibration cutting even when superimposition control is performed.

Solution to Problem

In order to solve the above-mentioned problem and achieve the object, the present invention provides a numerical control device for a machine tool, the machine tool including: a first drive shaft to move a first tool or a machining target, the first tool performing a first machining process; and a second drive shaft to move a second tool or the machining target, the second tool performing a second machining process, the numerical control device controlling the first drive shaft and the second drive shaft such that a movement of the second drive shaft is superimposed on a movement of the first drive shaft to allow the second machining process to be executed relative to the first machining process. The numerical control device of the present invention comprises a control computation unit to, in response to a superimposition control command to superimpose the movement of the second drive shaft on the movement of the first drive shaft, perform control on the first drive shaft, the second drive shaft, and a main shaft by changing at least one of a first vibration rate, a second vibration rate and a main shaft rotation speed on a basis of a first vibration command, a second vibration command and a main shaft rotation speed command such that the first vibration rate stays constant and the second vibration rate stays constant, the main shaft being a rotation axis of the machining target, the first vibration rate being the number of times that the first drive shaft vibrates per rotation of the main shaft, the second vibration rate being the number of times that the second drive shaft vibrates per rotation of the main shaft, the first vibration command being to vibrate the first drive shaft, the second vibration command being to vibrate the second drive shaft, the main shaft rotation speed command being directed to the main shaft, the main shaft rotation speed command being a command on the main shaft rotation speed per unit time.

Advantageous Effects of Invention

The numerical control device according to the present invention achieves the effect of enabling execution of the vibration cutting even when the superimposition control is performed.

BRIEF DESCRIPTION OF DRAWINGS

FIG. 26 is a diagram illustrating another example of a machining program for use in the numerical control device according to the second embodiment.

FIG. 27 is a flowchart illustrating a procedure for a third control process by the numerical control device according to the second embodiment.

FIG. 32 is a diagram illustrating an example of a machining program for use in a numerical control device according to the third embodiment.

FIG. 33 is a flowchart illustrating a procedure for a first control process by the numerical control device according to the third embodiment.

FIG. 34 is a flowchart illustrating a procedure for a second control process by the numerical control device according to the third embodiment.

FIG. 35 is a diagram illustrating an exemplary hardware configuration of a control computation unit according to any of the first to third embodiments.

DESCRIPTION OF EMBODIMENTS

Hereinafter, a numerical control device and a numerical control method according to embodiments of the present invention will be described in detail with reference to the drawings. The present invention is not limited to the embodiments.

First Embodiment

Figure 1:
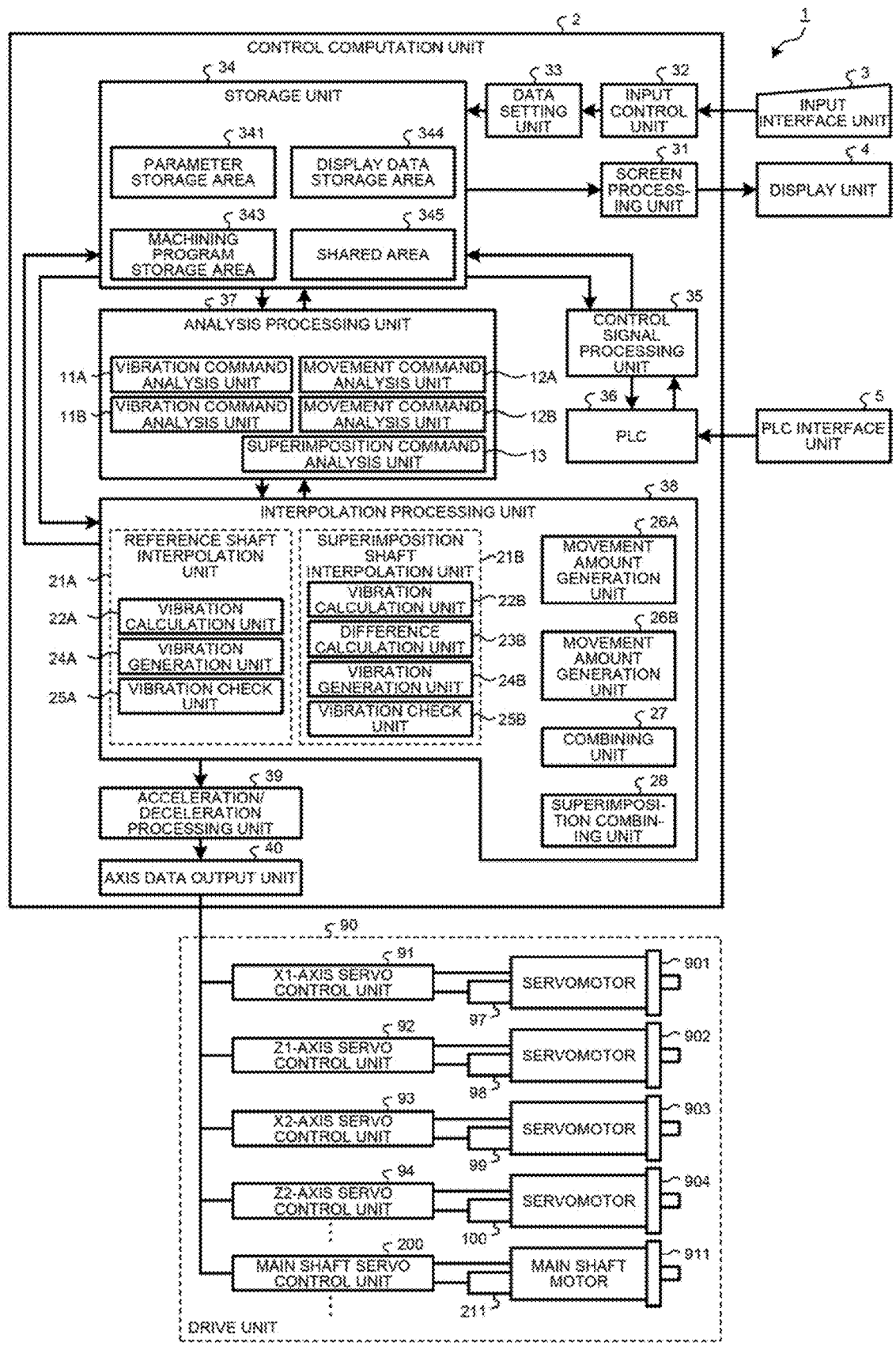
FIG. 1 is a diagram illustrating an exemplary configuration of a numerical control device according to a first embodiment of the present invention.
Figures 2, 3:
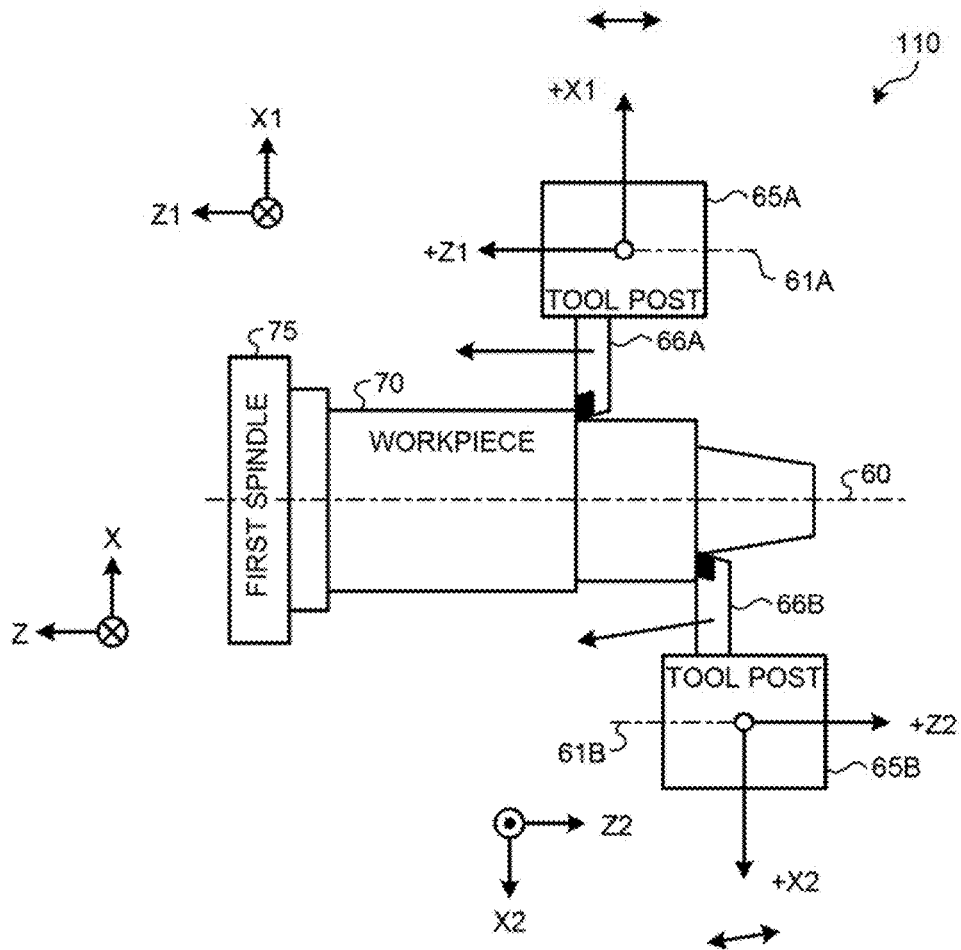
FIG. 2 is a diagram illustrating a configuration of a machine tool according to the first embodiment.
FIG. 3 is a diagram illustrating an example of a machining program for use in the numerical control device according to the first embodiment.

FIG. 1 is a diagram illustrating an exemplary configuration of a numerical control device according to the first embodiment. FIG. 2 is a diagram illustrating a configuration of a machine tool according to the first embodiment. In FIG. 2, the horizontal direction on the sheet of FIG. 2 is the Z-axis direction, and the vertical direction on the sheet of FIG. 2 is the X-axis direction. The X1 and X2 axes are axes parallel to the X axis, and the Z1 and Z2 axes are axes parallel to the Z axis.

The numerical control (NC) device 1 is a computer that executes both low-frequency vibration cutting control and superimposition control simultaneously on a machine tool 110. Low-frequency vibration cutting is machining with vibrating tools. In the following description, low-frequency vibration may be simply referred to as vibration.

The numerical control device 1 controls the machining of a machining target, i.e., a workpiece 70, allowing relative movement between a first tool and the workpiece 70 and relative movement between a second tool and the workpiece 70. The numerical control device 70 allows the relative movement between the first tool and the workpiece 70, with one or more drive shafts including a first drive shaft. The numerical control device 70 allows the relative movement between the second tool and the workpiece 70, with one or more drive shafts including a second drive shaft. That is, the numerical control device 1 includes a reference shaft 61A and a superimposition shaft 61B. The reference shaft 61A moves a tool 66A or the workpiece 70. The tool 66A performs a first machining process. The superimposition shaft 61B moves a tool 66B or the workpiece 70. The tool 66B performs a second machining process. The numerical control device 1 controls the reference shaft 61A and the superimposition shaft 61B such that the movement amount of the reference shaft 61A is superimposed on the movement amount of the superimposition shaft 61B to allow the second machining process to be executed relative to the first machining process. At this time, the numerical control device 1 vibrates the first tool and the second tool to allow the first and second tools perform vibration cutting on the workpiece 70. In the first embodiment, because vibration cutting and superimposition control are performed with the two drive shafts, the numerical control device 1 controls the vibration of each drive shaft or the rotation of the workpiece 70 in compliance with the constraint conditions for implementing the vibration cutting and the superimposition control.

The workpiece 70 is a workpiece to be machined by the machine tool 110. The machine tool 110 according to the present embodiment is described based on the assumption that the reference shaft 61A of FIG. 2 serving as the first drive shaft is the Z1 axis and the superimposition shaft 61B of FIG. 2 serving as the second drive shaft is the Z2 axis during the execution of superimposition control.

The numerical control device 1 includes a control computation unit 2, an input interface unit 3, a display unit 4, and a programmable logic controller (PLC) interface unit 5 such as a machine console panel for operating a PLC 36. FIG. 1 depicts a drive unit 90, which is a component of the machine tool 110. The numerical control device 1 may be applied to lathe machining or machining with a machining center. The following description is made as to the numerical control device 1 applied to lathe machining.

The drive unit 90 drives, for example, tool posts 65A and 65B of the machine tool 110. The drive unit 90 is a drive mechanism that drives the two tools 66A and 66B while rotating the workpiece 70. The drive unit 90 according to the present embodiment moves the tool 66A along the X1-axis direction and the Z1-axis direction. The Z1-axis direction is the axial direction of the reference shaft 61A. The drive unit 90 moves the tool 66B along the X2-axis direction and the Z2-axis direction. The Z2-axis direction is the axial direction of the superimposition shaft 61B.

In the case of superimposition control, the numerical control device 1 controls the actual movement of the superimposition shaft 61B by superimposing the movement amount specified for the reference shaft 61A and the movement amount specified for the superimposition shaft 61B. For the conventional scheme, the superimposition shaft 61B operates in synchronization with the reference shaft 61A in the absence of commands directed to the superimposition shaft 61B during superimposition control, such that the tools 66A and 66B operate in accordance with the same vibration waveform. Note that which axis serves as the reference shaft depends on the type of machine tool. The present embodiment gives an example in which the vibration direction of the tool 66A is the axial direction of the reference shaft 61A and the vibration direction of the tool 66B is a combined direction of the axial direction of the superimposition shaft 61B and the X2-axis direction. Therefore, in the following description, the vibration of the superimposition shaft 61B means the vibration in a combined direction of the Z2-axis direction and the X2-axis direction.

The drive unit 90 includes servomotors 901 to 904 and detectors 97 to 100. The servomotors 901 to 904 move the tools 66A and 66B in different axial directions specified by the numerical control device 1. The detectors 97 to 100 detect the positions and speeds of the servomotors 901 to 904. The drive unit 90 also includes servo control units for different axial directions that control the servomotors 901 to 904 on the basis of commands from the numerical control device 1. The servo control units for different axial directions perform feedback control on the servomotors 901 to 904 on the basis of the positions and speeds from the detectors 97 to 100.

An X1-axis servo control unit 91 of the servo control units controls the operation of the tool 66A in the X1-axis direction by controlling the servomotor 901. The Z1-axis servo control unit 92 controls the operation of the tool 66A in the Z1-axis direction by controlling the servomotor 902. The X2-axis servo control unit 93 controls the operation of the tool 66B in the X2-axis direction by controlling the servomotor 903. The Z2-axis servo control unit 94 controls the operation of the tool 66B in the Z2-axis direction by controlling the servomotor 904.

The drive unit 90 also includes a main shaft motor 911 that rotates the main shaft 60 for rotating the workpiece 70, and a detector 211 that detects the position and rotation speed of the main shaft motor 911. The rotation speed that is detected by the detector 211 is the rotation rate of the main shaft motor 911. In the case of a machine such as the machine tool 110 that performs lathe machining, the main shaft is the rotation axis of the workpiece 70, whereas in the case of a machining center, the main shaft is the rotation axis of a tool post.

The drive unit 90 also includes a main shaft servo control unit 200 that controls the main shaft motor 911 on the basis of a command from the numerical control device 1. The main shaft servo control unit 200 performs feedback control on the main shaft motor 911 on the basis of the position and speed from the detector 211. In the present embodiment, the number of rotations of the main shaft 60 per unit time is referred to as a main shaft rotation speed. The main shaft rotation speed is, for example, the number of rotations of the main shaft 60 per minute.

In a case where the machine tool 110 machines two workpieces 70 simultaneously, the drive unit 90 includes two sets of the main shaft motors 911, the detectors 211, and the main shaft servo control units 200.

The input interface unit 3 is a means for inputting information to the control computation unit 2. The input interface unit 3 includes an input means such as a keyboard, a button, or a mouse, and receives a user's input such as a command directed to the numerical control device 1, a machining program, or a parameter and inputs the received one to the control computation unit 2. The display unit 4 includes a display means such as a liquid crystal display device, and displays, on a display screen, information processed by the control computation unit 2. The PLC interface unit 5, which is, for example, a machine console panel, receives a user's action thereon, and sends, to the PLC 36, the instruction corresponding to the action.

The control computation unit 2, which is a control unit, includes an input control unit 32, a data setting unit 33, a storage unit 34, a screen processing unit 31, an analysis processing unit 37, a control signal processing unit 35, the PLC 36, an interpolation processing unit 38, an acceleration/deceleration processing unit 39, and an axis data output unit 40. Note that the PLC 36 may be placed outside the control computation unit 2.

The storage unit 34 includes a parameter storage area 341, a machining program storage area 343, a display data storage area 344, and a shared area 345. The parameter storage area 341 stores, for example, parameters for use in the processing of the control computation unit 2. Specifically, the parameter storage area 341 stores control parameters, servo parameters, and tool data for operating the numerical control device 1. The machining program storage area 343 stores machining programs for use in the machining on the workpiece 70. A machining program according to the present embodiment includes a vibration command and a movement command. The vibration command is a command to vibrate the tool 66A or 66B. The movement command is a command to move the tool 66A or 66B.

The display data storage area 344 stores screen display data for display on the display unit 4. The screen display data is data for displaying, on the display unit 4, information. The storage unit 34 also includes the shared area 345 that stores data for temporary use.

The screen processing unit 31 performs control for allowing the display unit 4 to display the screen display data stored in the display data storage area 344. The input control unit 32 receives information input from the input interface unit 3. The data setting unit 33 causes the storage unit 34 to store the information received by the input control unit 32.

The control signal processing unit 35 is connected to the PLC 36, and receives, from the PLC 36, signal information such as a relay for controlling the machine tool 110 or signal information of the machine console panel. The control signal processing unit 35 writes the received signal information into the shared area 345 of the storage unit 34. The written signal information is referred to by the interpolation processing unit 38 during machining operation. The analysis processing unit 37 outputs an auxiliary command to the shared area 345, in which case the control signal processing unit 35 reads the auxiliary command from the shared area 345, and sends the auxiliary command to the PLC 36. Auxiliary commands are commands other than commands to operate drive shafts that are numerical control shafts. Examples of auxiliary commands are M codes or T codes, which will be described later.

In response to an action on the PLC interface unit 5 such as the machine console panel, the PLC 36 executes the operation corresponding to this action. The PLC 36 stores a ladder program in which machine operation is described. In response to receiving a T code or M code that is an auxiliary command, the PLC 36 executes, on the machine tool 110, the process corresponding to the auxiliary command in accordance with the ladder program. After executing the process corresponding to the auxiliary command, the PLC 36 sends a completion signal indicating the completion of the machine control, to the control signal processing unit 35 in order to cause the next block of the machining program to be executed.

In the control computation unit 2, the control signal processing unit 35, the analysis processing unit 37, and the interpolation processing unit 38 are connected to one another via the storage unit 34 so as to write and read information via the storage unit 34. The control signal processing unit 35, the analysis processing unit 37, and the interpolation processing unit 38 write and read information therebetween via the storage unit 34, but the description of the writing and reading of the information may omit the existence of the the storage unit 34.

The user inputs the machining program number into the input interface unit 3 in selecting a machining program. The input information is written into the storage unit 34 via the input control unit 32 and the data setting unit 33. The analysis processing unit 37 reads the selected machining program from the machining program storage area 343 through the shared area 345, and performs analysis processing on each block (each line) of the machining program. The analysis processing unit 37 analyzes, for example, a G code (command related to shaft movement or the like), a T code (tool change command or the like), an S code (main shaft motor rotation speed command), and an M code (machine operation command).

In a case where the analyzed line contains a specific M code or a specific T code, the analysis processing unit 37 sends the analysis result to the PLC 36 via the shared area 345 and the control signal processing unit 35. In a case where the analyzed line contains an M code or G code, the analysis processing unit 37 sends the analysis result to the interpolation processing unit 38 via the shared area 345. The M code is sent to the PLC 36 via the control signal processing unit 35, and the PLC 36 executes the machine control corresponding to the M code. Upon completion of the execution, the result indicating the completion of the M code is written into the storage unit 34 via the control signal processing unit 35. The interpolation processing unit 38 refers to the execution result written to the storage unit 34. Specifically, the analysis processing unit 37 sends, to the interpolation processing unit 38, the main shaft rotation speed specified by the M code.

The analysis processing unit 37 includes vibration command analysis units 11A and 11B, movement command analysis units 12A and 12B, and a superimposition command analysis unit 13. The vibration command analysis unit 11A is a means for analyzing a vibration command for the reference shaft 61A, and the vibration command analysis unit 11B is a means for analyzing a vibration command for the superimposition shaft 61B.

The vibration command analysis unit 11A analyzes a vibration command contained in a machining program for the reference shaft 61A (such as a machining program 810A described later), generates vibration conditions for the reference shaft 61A, and sends the generated vibration conditions to the interpolation processing unit 38 via the shared area 345.

The vibration command analysis unit 11B analyzes a vibration command contained in a machining program for the superimposition shaft 61B (such as a machining program 810B described later), generates vibration conditions for the superimposition shaft 61B, and sends the generated vibration conditions to the interpolation processing unit 38 via the shared area 345.

A vibration command for the reference shaft 61A is a command to vibrate the reference shaft 61A in the Z1-axis direction that is the axial direction of the reference shaft 61A. A vibration command for the superimposition shaft 61B is a command to vibrate the superimposition shaft 61B in a combined direction of the X2-axis direction and the Z2-axis direction that is the axial direction of the superimposition shaft 61B. A vibration condition is a condition of vibration under which vibration cutting is executed. Examples of vibration conditions are a vibration amplitude and a vibration rate for vibration cutting. The vibration rate of the reference shaft 61A is the number of times that the reference shaft 61A vibrates during one rotation of the main shaft 60. The vibration rate of the superimposition shaft 61B is the number of times that the superimposition shaft 61B vibrates during one rotation of the main shaft 60. In other words, the vibration rate of the reference shaft 61A and the vibration rate of the superimposition shaft 61B each correspond to the vibration frequency per the period of time of one rotation of the main shaft 60. This can mean that examples of vibration conditions are a vibration amplitude and a vibration frequency for vibration cutting. In the present embodiment, because the reference shaft 61A vibrates, the vibration rate of the reference shaft 61A corresponds to the vibration rate of the tool 66A associated with the reference shaft 61A. In addition, because the superimposition shaft 61B vibrates, the vibration rate of the superimposition shaft 61B corresponds to the vibration rate of the tool 66B associated with the superimposition shaft 61B. In the machine tool 110 according to the present embodiment, when the reference shaft 61A is the first drive shaft and the superimposition shaft 61B is the second drive shaft, respectively, the vibration rate of the reference shaft 61A and the vibration rate of the superimposition shaft 61B are a first vibration rate and a second vibration rate, respectively. In contrast, in the machine tool 110 according to the present embodiment, when the reference shaft 61A is the second drive shaft and the superimposition shaft 61B of the machine tool 110 according to the present embodiment are the second drive shaft and the first drive shaft, respectively, the vibration rate of the reference shaft 61A and the vibration rate of the superimposition shaft 61B are the second vibration rate and the first vibration rate, respectively.

The movement command analysis unit 12A generates movement conditions for the tool 66A corresponding to a G code, and sends the generated movement conditions to the interpolation processing unit 38. The movement command analysis unit 12B generates movement conditions for the tool 66B corresponding to a G code, and sends the movement conditions to the interpolation processing unit 38. Movement conditions, which are tool feed conditions for moving the machining position of the tool 66A or 66B, are indicated by, for example, the speed for moving the tool post 65A or 65B, the position to which the tool post 65A or 65B is moved. The tool feed for the tool 66A is a process of advancing the tool 66A in the axial direction of the reference shaft 61A, and the tool feed for the tool 66B is a process of advancing the tool 66B in the axial direction of the superimposition shaft 61B.

The superimposition command analysis unit 13 analyzes a machining program to determine whether a superimposition control command is contained in the machining program. When a G126 command (described later) is contained in the machining program, the superimposition command analysis unit 13 determines that a superimposition control command is contained in the machining program. A superimposition control command is a control command for superimposing the movement amount of the reference shaft 61A on the superimposition shaft 61B. The superimposition command analysis unit 13 sends the result of analisis of the superimposition control command to the interpolation processing unit 38.

The interpolation processing unit 38 includes a reference shaft interpolation unit 21A, a superimposition shaft interpolation unit 21B, a movement amount generation unit 26A, a movement amount generation unit 26B, a superimposition combining unit 28, and a combining unit 27. The interpolation processing unit 38 changes at least one of the main shaft rotation speed, the vibration rate of the reference shaft 61A, and the vibration rate of the superimposition shaft 61B so as to bring the vibration of the reference shaft 61A and the vibration of the superimposition shaft 61B into synchronization with the main shaft rotation speed.

For example, when the vibration rate of the reference shaft 61A and the vibration rate of the superimposition shaft 61B are different from each other, the interpolation processing unit 38 changes the vibration rate of the superimposition shaft 61B to a vibration rate that depends on the vibration rate of the reference shaft 61A. In this case, the interpolation processing unit 38 changes the main shaft rotation speed such that the main shaft rotation speed synchronizes with the vibration of the reference shaft 61A, and the interpolation processing unit 38 changes the vibration rate of the superimposition shaft 61B such that the vibration of the superimposition shaft 61B synchronizes with the changed main shaft rotation speed.

Alternatively, when the vibration rate of the reference shaft 61A and the vibration rate of the superimposition shaft 61B are different from each other, the interpolation processing unit 38 may change the vibration rate of the reference shaft 61A to a vibration rate that depends on the vibration rate of the superimposition shaft 61B. In this case, the interpolation processing unit 38 changes the main shaft rotation speed such that the main shaft rotation speed synchronizes with the vibration of the superimposition shaft 61B, and the interpolation processing unit 38 changes the vibration rate of the reference shaft 61A such that the vibration of the reference shaft 61A synchronizes with the new main shaft rotation speed.

The process of synchronizing the vibration of the reference shaft 61A with the main shaft rotation speed is a process of adjusting the vibration rate of the reference shaft 61A or the main shaft rotation speed such that the reference shaft 61A vibrates a constant number of times during one rotation of the main shaft 60. The process of synchronizing the vibration of the superimposition shaft 61B with the main shaft rotation speed is a process of adjusting the vibration rate of the superimposition shaft 61B or the main shaft rotation speed such that the superimposition shaft 61B vibrates a constant number of times during one rotation of the main shaft 60. In other words, the process of synchronizing the vibration of the reference shaft 61A with the main shaft rotation speed is a process of synchronizing the vibration frequency (vibration rate) of the reference shaft 61A with the main shaft rotation speed, and the process of synchronizing the vibration of the superimposition shaft 61B with the main shaft rotation speed is a process of synchronizing the vibration frequency of the superimposition shaft 61B with the main shaft rotation speed. In the first embodiment, the vibration of the reference shaft 61A is defined by the vibration rate, and thus the synchronization of the vibration of the reference shaft 61A with the main shaft rotation speed may be referred to as the synchronization of the vibration rate of the reference shaft 61A with the main shaft rotation speed. Similarly, in the first embodiment, the vibration of the superimposition shaft 61B is defined by the vibration rate, and thus the synchronization of the vibration of the superimposition shaft 61B with the main shaft rotation speed may be referred to as the synchronization of the vibration rate of the superimposition shaft 61B with the main shaft rotation speed.

Note that the constant number of times that the reference shaft 61A vibrates is variable, and thus a rate that depends on superimposition control can be selected. Similarly, the constant number of times that the superimposition shaft 61B vibrates is variable, and thus a rate that depends on superimposition control can be selected.

The numerical control device 1 performs superimposition control in which case, the superimposition combining unit 28 combines the movement amount of the reference shaft 61A with the movement amount of the superimposition shaft 61B, such that the movement of the superimposition shaft 61B is superimposed on the movement of the reference shaft 61A. As a result, the tool post 65B undergoes the same vibration as the tool post 65A. For this reason, the interpolation processing unit 38 vibrates the tool post 65B after subtracting the amplitude of the vibration command that vibrates the tool post 65A from the amplitude of the vibration command that vibrates the tool post 65B. The subtracted amplitude is supplemented by the superimposition control. Consequently, the tool post 65B can be vibrated with the amplitude of the original vibration command.

The movement amount generation unit 26A receives, from the analysis processing unit 37, the analysis result for the reference shaft 61A. The analysis result for the reference shaft 61A is movement conditions and vibration conditions, of the reference shaft 61A. Then, the movement amount generation unit 26A performs interpolation processing on the movement conditions and vibration conditions of the reference shaft 61A, and sends, to the superimposition combining unit 28 and the combining unit 27, a movement amount per unit time corresponding to the interpolation processing result. Specifically, the movement amount generation unit 26A has a function of calculating a tool feed movement amount on the basis of the movement conditions of the reference shaft 61A which the analysis processing unit 37 provides as the analysis result. The tool feed movement amount is an amount for moving the tool 66A in a unit time. The movement amount generation unit 26A also has a function of calculating a vibration movement amount on the basis of the vibration conditions of the reference shaft 61A which analyzed by the analysis processing unit 37 provides as the analysis result. The vibration movement amount is an amount for vibrating the tool 66A in a unit time. The movement amount generation unit 26A uses, for example, linear interpolation or arc interpolation in calculating the tool feed movement amount. The movement amount generation unit 26A further has a function of combining the tool feed movement amount and the vibration movement amount. The movement amount generation unit 26A sends the combined movement amount to the superimposition combining unit 28 and the combining unit 27.

The movement amount generation unit 26B receives, from the analysis processing unit 37, the analysis result for the superimposition shaft 61B. The analysis result for the superimposition shaft 61B is movement conditions and vibration conditions, of the superimposition shaft 61B. Then, the movement amount generation unit 26B performs interpolation processing on the movement conditions and vibration conditions of the superimposition shaft 61B, and sends, to the superimposition combining unit 28, the movement amount per unit time corresponding to the interpolation processing result. Specifically, the movement amount generation unit 26B has a function of calculating a tool feed movement amount on the basis of the movement conditions of the superimposition shaft 61B which the analysis processing unit 37 provides as the analysis result. The tool feed movement amount is an amount for moving the tool 66B in a unit time. The movement amount generation unit 26B also has a function of calculating a vibration movement amount on the basis of the vibration conditions of the superimposition shaft 61B which the analysis processing unit 37 provides as the analysis result. The vibration movement amount is an amount for vibrating the tool 66B in a unit time. The movement amount generation unit 26B further has a function of combining the tool feed movement amount and the vibration movement amount. The movement amount generation unit 26B sends the combined movement amount to the superimposition combining unit 28.

The superimposition combining unit 28 superimposes the combined movement amount from the movement amount generation unit 26A on the combined movement amount from the movement amount generation unit 26B, and sends the superimposed movement amount to the combining unit 27.

The reference shaft interpolation unit 21A includes a vibration calculation unit 22A, a vibration generation unit 24A, and a vibration check unit 25A. The superimposition shaft interpolation unit 21B includes a vibration calculation unit 22B, a difference calculation unit 23B as an amplitude calculation unit, a vibration generation unit 24B, and a vibration check unit 25B. The difference calculation unit 23B is an amplitude calculation unit.

The vibration calculation unit 22A reads the main shaft rotation speed, the vibration rate of the reference shaft 61A, the vibration rate of the superimposition shaft 61B, and the amplitude of the reference shaft 61A from the shared area 345. Then, the vibration calculation unit 22A changes the main shaft rotation speed to a main shaft rotation speed that synchronizes with the vibration rate of the reference shaft 61A. In other words, the vibration calculation unit 22A changes the initial main shaft rotation speed (command rotation speed directed to the main shaft 60) to a main shaft rotation speed that synchronizes with the vibration rate of the reference shaft 61A. The initial main shaft rotation speed is the main shaft rotation speed specified in the machining program. Further, when the vibration rate of the reference shaft 61A and the vibration rate of the superimposition shaft 61B are different from each other, the vibration calculation unit 22A calculates, from the main shaft rotation speed and vibration rates specified by the commands, a main shaft rotation speed that matches the vibration conditions of the reference shaft 61A and the superimposition shaft 61B. The calculated man shaft rotation speed defines a changed man shaft rotation speed. The vibration calculation unit 22A sends the changed main shaft rotation speed to the vibration calculation unit 22B and the combining unit 27.

In addition, in response to receiving, from the vibration calculation unit 22B, a main shaft rotation speed that synchronizes with the vibration rate of the superimposition shaft 61B, the vibration calculation unit 22A changes the vibration rate of the reference shaft 61A such that the vibration rate synchronizes with the main shaft rotation speed. The main shaft rotation speed sent from the vibration calculation unit 22B to the vibration calculation unit 22A is the main shaft rotation speed changed by the vibration calculation unit 22B. The vibration calculation unit 22A sends the amplitude of the reference shaft 61A and the changed vibration rate of the reference shaft 61A to the vibration generation unit 24A.

The vibration generation unit 24A generates a vibration waveform for the reference shaft 61A (hereinafter referred to as a reference vibration waveform) on the basis of the vibration rate and amplitude of the reference shaft 61A sent from the vibration calculation unit 22A. The reference vibration waveform represents the position in each axial direction with respect to time. Any reference vibration waveform can be used such as a sine wave, but the following description is based on the assumption that the vibration waveform is a triangular wave. The vibration generation unit 24A sends the generated reference vibration waveform to the combining unit 27.

The vibration check unit 25A determines whether there is a vibration command directed to the superimposition shaft 61B. In the absence of a vibration command directed to the superimposition shaft 61B, the vibration check unit 25A informs the vibration calculation units 22A and 22B and the difference calculation unit 23B that there is no vibration command directed to the superimposition shaft 61B. In the absence of a vibration command for the superimposition shaft 61B, the vibration check unit 25A may notify the combining unit 27 that there is no vibration command directed to the superimposition shaft 61B.

The vibration calculation unit 22B reads the main shaft rotation speed, the vibration rate of the reference shaft 61A, and the vibration rate of the superimposition shaft 61B from the shared area 345. Then, the vibration calculation unit 22B changes the main shaft rotation speed to a main shaft rotation speed that synchronizes with the vibration rate of the superimposition shaft 61B. In other words, the vibration calculation unit 22B changes the initial main shaft rotation speed to a main shaft rotation speed that synchronizes with the vibration rate of the superimposition shaft 61B. The initial main shaft rotation speed is the main shaft rotation speed specified in the machining program. Further, when the vibration rate of the reference shaft 61A and the vibration rate of the superimposition shaft 61B are different from each other, the vibration calculation unit 22B calculates, from the main shaft rotation speed and vibration rates specified by the commands, a main shaft rotation speed that matches the vibration conditions of the reference shaft 61A and the superimposition shaft 61B. The calculated main shaft rotation speed defines a changed main shaft rotation speed. The vibration calculation unit 22B sends the changed main shaft rotation speed to the vibration calculation unit 22A and the combining unit 27.

In addition, in response to receiving, from the vibration calculation unit 22A, a main shaft rotation speed that synchronizes with the vibration rate of the reference shaft 61A, the vibration calculation unit 22B changes the vibration rate of the superimposition shaft 61B such that the vibration rate synchronizes with the main shaft rotation speed. The main shaft rotation speed sent from the vibration calculation unit 22A to the vibration calculation unit 22B is the main shaft rotation speed changed by the vibration calculation unit 22A. The vibration calculation unit 22B sends the changed vibration rate of the superimposition shaft 61B to the vibration generation unit 24B.

The difference calculation unit 23B reads the amplitude of the reference shaft 61A (tool post 65A) and the amplitude of the superimposition shaft 61B (tool post 65B) from the shared area 345. The difference calculation unit 23B calculates an amplitude difference by subtracting the amplitude of the reference shaft 61A from the amplitude of the superimposition shaft 61B. The difference calculation unit 23B subtracts the calculated amplitude difference from the amplitude of the superimposition shaft 61B, thereby providing a post-subtraction amplitude of the superimposition shaft 61B. The difference calculation unit 23B sends the post-subtraction amplitude of the superimposition shaft 61B to the vibration generation unit 24B. Note that this method for calculating the actual vibration amplitude of the superimposition shaft 61B is only an example, and any calculation method is acceptable where the actual vibration amplitude of the superimposition shaft 61B is equal to the initial vibration command amplitude.

The vibration generation unit 24B generates a vibration waveform for the superimposition shaft 61B (hereinafter referred to as a superimposition vibration waveform) on the basis of the vibration rate of the superimposition shaft 61B sent from the vibration calculation unit 22B and the amplitude of the superimposition shaft 61B sent from the difference calculation unit 23B. The superimposition vibration waveform indicates the hourly position of the tool 66B in a combined direction of the Z2-axis direction and the X2-axis direction. Any superimposition vibration waveform can be used such as a sine wave, but the following description is based on the assumption that the vibration waveform is a triangular wave. The vibration generation unit 24B sends the generated superimposition vibration waveform to the combining unit 27.

The vibration check unit 25B determines whether there is a vibration command directed to the reference shaft 61A. In the absence of a vibration command directed to the reference shaft 61A, the vibration check unit 25B informs the vibration calculation units 22A and 22B and the difference calculation unit 23B that there is no vibration command directed to the reference shaft 61A. In the absence of a vibration command for the reference shaft 61A, the vibration check unit 25B may notify the combining unit 27 that there is no vibration command directed to the reference shaft 61A.

In the present embodiment, when the reference shaft 61A is the first drive shaft and the superimposition shaft 61B is the second drive shaft, the vibration check unit 25A is a first vibration check unit and the vibration check unit 25B is a second vibration check unit. When the reference shaft 61A is the second drive shaft and the superimposition shaft 61B is the first drive shaft, the vibration check unit 25A is the second vibration check unit and the vibration check unit 25B is the first vibration check unit.

The movement of the tool 66A or 66B is the sum of the movement for vibration cutting and the movement in the direction (feed direction) for proceeding with the machining of the workpiece 70. Therefore, the combining unit 27 adds up the movement amount for vibration cutting and the movement amount for proceeding with the machining of the workpiece 70. The movement amount of the tool 66A for vibration cutting is indicated by the reference vibration waveform sent from the vibration generation unit 24A, and the movement amount of the tool 66B for vibration cutting is indicated by the superimposition vibration waveform sent from the vibration generation unit 24B.

The combining unit 27 calculates a combined movement amount per unit time for the reference shaft 61A by combining the reference vibration waveform sent from the vibration generation unit 24A and the movement amount for the reference shaft 61A sent from the movement amount generation unit 26A.

The combining unit 27 also calculates a combined movement amount per unit time for the superimposition shaft 61B by combining the superimposition vibration waveform sent from the vibration generation unit 24B and the movement amount for the superimposition shaft 61B sent from the superimposition combining unit 28.

The combining unit 27 sends the result of the interpolation processing (calculation result) to the acceleration/deceleration processing unit 39. Specifically, the combining unit 27 sends the combined movement amount for the reference shaft 61A and the combined movement amount for the superimposition shaft 61B to the acceleration/deceleration processing unit 39. The combining unit 27 also sends the main shaft rotation speed to the acceleration/deceleration processing unit 39.

On the basis of the result of the interpolation processing supplied from the interpolation processing unit 38, the acceleration/deceleration processing unit 39 performs acceleration/deceleration processing for smoothly changing the acceleration. For example, the acceleration/deceleration processing unit 39 performs acceleration/deceleration processing for the start and stop of the movement. Specifically, on the basis of the combined movement amount for the reference shaft 61A, the acceleration/deceleration processing unit 39 generates a speed command directed to the reference shaft 61A. On the basis of the combined movement amount for the superimposition shaft 61B, also, the acceleration/deceleration processing unit 39 generates a speed command directed to the superimposition shaft 61B. The speed command generated by the acceleration/deceleration processing unit 39 is a command that specifies a speed per unit time. The acceleration/deceleration processing unit 39 generates speed commands for the X1 axis, the X2 axis, the Z1 axis, and the Z2 axis.

Where the acceleration/deceleration processing unit 39 according to the present embodiment receives a reference vibration waveform from the vibration generation unit 24A, the acceleration/deceleration processing unit 39 generates speed commands directed to the X1 axis and the Z1 axis. Where the acceleration/deceleration processing unit 39 receives a superimposition vibration waveform from the vibration generation unit 24B, the acceleration/deceleration processing unit 39 generates speed commands directed to the X2 axis and the Z2 axis. The acceleration/deceleration processing unit 39 sends the speed commands, which are the processing result of the acceleration/deceleration processing, to the axis data output unit 40. The acceleration/deceleration processing unit 39 sends, to the axis data output unit 40, a rotation speed command corresponding to the main shaft rotation speed.

The axis data output unit 40 outputs the speed commands to the drive unit 90. Specifically, the axis data output unit 40 outputs, to the X1-axis servo control unit 91, the speed command directed to the X1 axis. The axis data output unit 40 outputs, to the Z1-axis servo control unit 92, the speed command directed to the Z1 axis. The axis data output unit 40 also outputs, to the X2-axis servo control unit 93, the speed command directed to the X2 axis. The axis data output unit 40 outputs, to the Z2-axis servo control unit 94, the speed command directed to the Z2 axis. The axis data output unit 40 also outputs, to the main shaft servo control unit 200, the rotation speed command directed to the main shaft 60. As a result, the X1-axis servo control unit 91, the Z1-axis servo control unit 92, the X2-axis servo control unit 93, the Z2-axis servo control unit 94, and the main shaft servo control unit 200 control the operation of the tool 66A in the X1-axis direction and the Z1-axis direction, the operation of the tool 66B in the X2-axis direction and the Z2-axis direction, and the rotation operation of the main shaft 60.

An outline of the operation procedure for machining control by the numerical control device 1 will be described. At the start of machining by the machine tool 110, the PLC 36 outputs a cycle start signal to the control signal processing unit 35, and the control signal processing unit 35 outputs the cycle start signal to the interpolation processing unit 38. As a result, the interpolation processing unit 38 activates the analysis processing unit 37.

After that, the analysis processing unit 37 reads and analyzes the machining program block by block, and stores the analysis result, namely, vibration conditions, movement conditions, and main shaft rotation speed in the shared area 345. Then, the interpolation processing unit 38 calculates a combined movement amount per unit time for the reference shaft 61A and a combined movement amount per unit time for the superimposition shaft 61B on the basis of the analysis result from the analysis processing unit 37, and sends the calculated combined movement amounts to the acceleration/deceleration processing unit 39.

As a result, on the basis of the reference vibration waveform and the superimposition vibration waveform from the interpolation processing unit 38, the acceleration/deceleration processing unit 39 generates speed commands directed to individual axises. These speed commands are output from the axis data output unit 40 to the drive unit 90, and the drive unit 90 controls the operation of each axis according to the speed commands.

Note that the machine tool 110 controlled by the numerical control device 1 may vibrate the workpiece 70. That is, the workpiece 70 and the tools 66A and 66B may be moved relative to each other to machine the workpiece 70, vibrating the tools 66A and 66B or the workpiece 70. The process in such a case will be described later in the second embodiment. The present embodiment is based on the assumption that the workpiece 70 is fixed and the tool 66A and the tool 66B are vibrated.

The machine tool 110 according to the first embodiment is a one-spindle two-post lathe including the tool post 65A having the reference shaft 61A. A one-spindle two-post lathe is a lathe equipped with a single main shaft and two tool posts. The tool posts 65A and 65B are also called turrets. An example of the machine tool 110 is a turret lathe.

The machine tool 110 includes a headstock with a first spindle 75. The first spindle 75 rotates with the workpiece 70 attached thereto, thereby rotating the workpiece 70. The rotation axis of the workpiece 70, which is provided by the first spindle 75, is the main shaft 60 provided on the headstock.

The machine tool 110 includes the tool post 65A and the tool post 65B. The tool post 65A is a first tool post. The tool post 65B is a second tool post. The reference shaft 61A is provided on the tool post 65A, and the superimposition shaft 61B is provided on the tool post 65B. The tool post 65A is movable in the X1-axis direction and the Z1-axis direction, and the tool post 65B is movable in the X2-axis direction and the Z2-axis direction. FIG. 2 depicts an example of the machine tool 110 in which the Z1 axis is the reference shaft 61A and the Z2 axis is the superimposition shaft 61B. The numerical control device 1 may perform superimposition control not only in the Z-axis direction but also in the X-axis direction. For example, the machine tool 110 may have the X1 axis defining a reference shaft, and the X2 axis defining a superimposition shaft. The machine tool 110 may also enable multiple combinations of reference shafts and superimposition shafts. That is, the machine tool 110 may include a combination of the Z2 axis defining a superimposition shaft and the Z1 axis defining a reference shaft, and a combination of the X2 axis defining a superimposition shaft and the X1 axis defining a reference shaft. In order for the numerical control device 1 to perform superimposition control in the Z-axis direction and the X-axis direction, a first direction defined by a combination of the Z1-axis direction and the X1-axis direction is a reference shaft, and a second direction defined by a combination of the Z2-axis direction and the X2-axis direction is a superimposition shaft. The first direction is parallel to the second direction.

The tool post 65A is the tool post for the reference shaft 61A, and the tool post 65B is the tool post for the superimposition shaft 61B. The tool posts 65A and 65B are swivel tool posts. The tool post 65A can be equipped with a plurality of tools 66A, and the tools 66A are turned for changeover between the tools 66A. Similarly, the tool post 65B can be equipped with a plurality of tools 66B, and the tools 66B are turned for changeover between the tools 66B.

The tool post 65A is vibrated in the Z1-axis direction to perform vibration cutting machining on the workpiece 70 with the tool 66A. The tool post 65B is vibrated in a combined direction of the Z2-axis direction and the X2-axis direction to perform vibration cutting machining on the workpiece 70 with the tool 66B. The vibration component of the tool post 65B in the Z2-axis direction includes a superimposition-control-based vibration component in the Z1-axis direction. In the following description, for convenience of explanation, the vibration of the tool post 65A may be described as the vibration of the tool 66A. Similarly, the vibration of the tool post 65B may be described as the vibration of the tool 66B.

Vibration constraint conditions for the machine tool 110 are (L1-1) to (L1-3) below.

(L1-1) The main shaft rotation speed during vibration cutting must be the same for the reference shaft 61A and the superimposition shaft 61B.

(L1-2) The vibration rates of the tools 66A and 66B during one rotation of the main shaft 60 may be different for the reference shaft 61A and the superimposition shaft 61B.

However, both the reference shaft 61A and the superimposition shaft 61B must operate at a vibration rate synchronized with the main shaft rotation speed during vibration cutting.

(L1-3) The vibration amplitudes may be different for the reference shaft 61A and the superimposition shaft 61B.

The reason why (L1-2) and (L1-3) specify the different vibration rates and the different amplitudes for the reference shaft 61A and the superimposition shaft 61B is that the vibration of the reference shaft 61A is not transmitted to the superimposition shaft 61B in the machine tool 110.

FIG. 3 is a diagram illustrating an example of a machining program for use in the numerical control device according to the first embodiment. The machining program 81 is used when the numerical control device 1 controls the machine tool 110. For this reason, the machining program 81 includes the machining program 810A for the reference shaft 61A and the machining program 810B for the superimposition shaft 61B.

The main shaft rotation speed command M3 S1 in the machining program 81 is a command for the main shaft rotation speed directed to the main shaft 60. M3 S1=1200 is a command to rotate the main shaft 60 1200 times per minute. G0 is a positioning command, G126 is a superimposition control command, G165 is a low-frequency vibration command, and G1 is a movement command. "A" defined in G165 is the amplitude of vibration, and "D" is the vibration rate during one rotation of the main shaft 60.

According to the machining program 81, the tool 66A is positioned by G0 of the machining program 810A, and the tool 66B is positioned by G0 of the machining program 810B.

In a case where G126 is used, the movement of the axis specified by G126 is subjected to superimposition control. G126 of the machining program 810A is a command to perform control for superimposition of the Z1 axis on the Z2 axis. Specifically, G126 is a command to superimpose the movement of the superimposition shaft 61B on the movement of the reference shaft 61A. Combining the movement amount of the reference shaft 61A with the movement amount of the superimposition shaft 61B superimposes the operation of the Z2 axis, which is the superimposition shaft 61B, on the operation of the Z1 axis, which is the reference shaft 61A.

In a case where G165 is used in the machining program 810A for the reference shaft 61A, the tool 66A is vibrated in the Z1-axis direction at the amplitude and vibration rate specified by G165. The illustrated example indicates that the tool 66A is vibrated at an amplitude of 0.2 mm and a vibration rate of 0.5 during one rotation of the main shaft 60.

In a case where G165 is used in the machining program 810B for the superimposition shaft 61B, the tool 66B is vibrated at the amplitude and vibration rate specified by G165. The illustrated example indicates that the tool 66B is vibrated at an amplitude of 0.3 mm and a vibration rate of 4.5 during one rotation of the main shaft 60.

When the reference shaft 61A is the first drive shaft, G165 for the reference shaft 61A is a first vibration command, and when the superimposition shaft 61B is the second drive shaft, G165 for the superimposition shaft 61B is a second vibration command. When the reference shaft 61A is the second drive shaft, G165 for the reference shaft 61A is the second vibration command, and when the superimposition shaft 61B is the first drive shaft, G165 for the superimposition shaft 61B is the first vibration command.

In a case where the machining program 81 is used, the vibration calculation units 22A and 22B use any of the following methods (M1-1) to (M1-3) to calculate and set a new vibration rate for superimposition control and a new main shaft rotation speed for superimposition control. As a result, each axis is controlled by the new vibration rate and the new main shaft rotation speed.

(M1-1) Method for Changing the Vibration Rate of the Superimposition Shaft 61B in Accordance with the Vibration Rate of the Reference Shaft 61A In this case, the vibration calculation unit 22A calculates, from D=0.5 and S1=1200, a main shaft rotation speed that can synchronize with the vibration rate of the reference shaft 61A. D=0.5 is the vibration rate of the reference shaft 61A, and S1=1200 is the main shaft rotation speed command directed to the main shaft 60. The vibration calculation unit 22A calculates the main shaft rotation speed, using information in the numerical control device 1. The main shaft rotation speed calculated by the vibration calculation unit 22A is the actual main shaft rotation speed for vibration cutting. In a case where a plurality of candidates for the main shaft rotation speed are available, the vibration calculation unit 22A employs one close to the initial main shaft rotation speed of 1200 (times/min).

Assume that the main shaft rotation speed calculated by the vibration calculation unit 22A is 1205 (times/min). The vibration calculation unit 22A sends the calculated main shaft rotation speed to the vibration calculation unit 22B. The vibration calculation unit 22B changes the vibration rate of the superimposition shaft 61B by calculating a vibration rate that synchronizes with the calculation result of 1205 (times/min). The vibration calculation unit 22B calculates the vibration rate of the superimposition shaft 61B, using information in the numerical control device 1. In a case where a plurality of candidates for the vibration rate of the superimposition shaft 61B are available, the vibration calculation unit 22B employs one close to 4.5 that is the initial vibration rate of the superimposition shaft 61B. For example, the vibration rate of the superimposition shaft 61B calculated by the vibration calculation unit 22B can be 3.5.

(M1-2) Method for Changing the Vibration Rate of the Reference Shaft 61A in Accordance with the Vibration Rate of the Superimposition Shaft 61B In this case, from D=4.5 and S1=1200, the vibration calculation unit 22B calculates a main shaft rotation speed that can synchronize with the vibration rate of the superimposition shaft 61B. D=4.5 is the vibration rate of the superimposition shaft 61B, and S1=1200 is the main shaft rotation speed command directed to the main shaft 60. The vibration calculation unit 22B calculates the main shaft rotation speed, using information in the numerical control device 1. The main shaft rotation speed calculated by the vibration calculation unit 22B is the actual main shaft rotation speed for vibration cutting. In a case where a plurality of candidates for the main shaft rotation speed are available, the vibration calculation unit 22B employs one close to the initial main shaft rotation speed of 1200 (times/min).

Assume that the main shaft rotation speed calculated by the vibration calculation unit 22B is 1250 (times/min). The vibration calculation unit 22B sends the calculated main shaft rotation speed to the vibration calculation unit 22A. The vibration calculation unit 22A changes the vibration rate of the reference shaft 61A by calculating a vibration rate that synchronizes with the calculation result of 1250 (times/min). The vibration calculation unit 22A calculates the vibration rate of the reference shaft 61A, using information in the numerical control device 1. In a case where a plurality of candidates for the vibration rate of the reference shaft 61A are available, the vibration calculation unit 22A employs one close to 0.5 that is the initial vibration rate of the reference shaft 61A. For example, the vibration rate of the reference shaft 61A calculated by the vibration calculation unit 22A can be 1.5.

(M1-3) Method for Averaging the Vibration Rate of the Reference Shaft 61A and the Vibration Rate of the Superimposition Shaft 61B The average of the vibration rate of the reference shaft 61A and the vibration rate of the superimposition shaft 61B may be calculated by either the vibration calculation unit 22A or the vibration calculation unit 22B. The following description gives an example in which the average of the vibration rate of the reference shaft 61A and the vibration rate of the superimposition shaft 61B is calculated by the vibration calculation unit 22A.

The vibration calculation unit 22A calculates an average rate by taking the average of D=0.5 and D=4.5. D=0.5 is the vibration rate of the reference shaft 61A, and D=4.5 is the vibration rate of the superimposition shaft 61B. The resultant average rate is 2.5. The vibration calculation unit 22A sets the calculation result as the vibration rate of the reference shaft 61A and the vibration rate of the superimposition shaft 61B.

The vibration calculation unit 22A also calculates a main shaft rotation speed that can synchronize with the calculated average rate of 2.5. The vibration calculation unit 22A calculates the main shaft rotation speed, using information in the numerical control device 1. In a case where a plurality of candidates for the main shaft rotation speed are available, the vibration calculation unit 22A employs one close to the initial main shaft rotation speed of 1200 (times/min). For example, the main shaft rotation speed calculated by the vibration calculation unit 22A can be 1227 (times/min).

Figure 4:
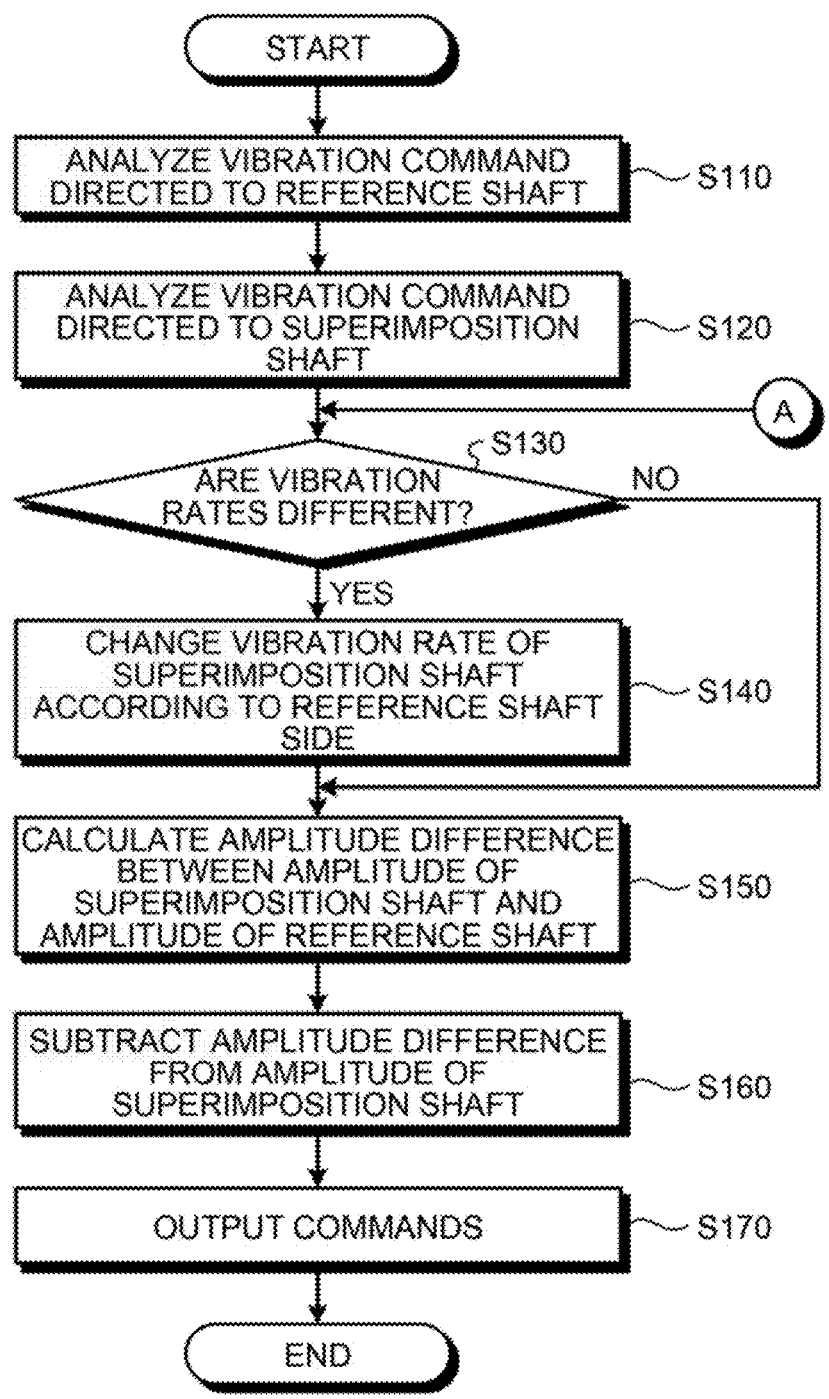
FIG. 4 is a flowchart illustrating a procedure for a first control process by the numerical control device according to the first embodiment.

Next, a procedure for controlling the machine tool 110 will be described. FIG. 4 is a flowchart illustrating a procedure for a first control process by the numerical control device according to the first embodiment. FIG. 4 represents a procedure for controlling the machine tool 110 by the numerical control device 1. The first control process of FIG. 4 is a control process for changing the vibration rate of the superimposition shaft 61B to a vibration rate that depends on the vibration rate of the reference shaft 61A.

The vibration command analysis unit 11A analyzes a vibration command contained in the machining program 810A for the reference shaft 61A (step S110), and generates vibration conditions for the reference shaft 61A. The vibration command analysis unit 11B analyzes a vibration command contained in the machining program 810B for the superimposition shaft 61B (step S120), and generates vibration conditions for the superimposition shaft 61B. In the present embodiment, the vibration command of the machining program 810A includes a first amplitude, i.e. the amplitude of the reference shaft 61A, and the vibration command of the machining program 810B includes a second amplitude, i.e. the amplitude of the superimposition shaft 61B.

The vibration command analysis unit 11A stores the vibration conditions of the reference shaft 61A in the shared area 345, and the vibration command analysis unit 11B stores the vibration conditions of the superimposition shaft 61B in the shared area 345. The vibration calculation units 22A and 22B read, from the shared area 345, the vibration rate of the reference shaft 61A, the vibration rate of the superimposition shaft 61B, and the main shaft rotation speed.

The vibration calculation unit 22A determines whether the vibration rate of the reference shaft 61A and the vibration rate of the superimposition shaft 61B are different from each other (step S130). When the vibration rate of the reference shaft 61A and the vibration rate of the superimposition shaft 61B are different from each other (steps S130: Yes), the vibration calculation units 22A and 22B execute the above-described process (M1-1). Specifically, the vibration calculation unit 22A calculates a main shaft rotation speed that synchronizes with the vibration rate of the reference shaft 61A, and the vibration calculation unit 22B changes the vibration rate of the superimposition shaft 61B such that the vibration rate synchronizes with this calculated main shaft rotation speed. In this way, the vibration calculation units 22A and 22B change the vibration rate of the superimposition shaft 61B in accordance with the vibration rate of the reference shaft 61A (step S140).

Alternatively, in step S140, the vibration calculation units 22A and 22B may execute the above-described process (M1-2) for changing the vibration rate of the reference shaft 61A in accordance with the vibration rate of the superimposition shaft 61B. Still alternatively, in step S140, the vibration calculation unit 22A or the vibration calculation unit 22B may execute the above-described process (M1-3) of calculating the average rate of the vibration rate of the reference shaft 61A and the vibration rate of the superimposition shaft 61B, and setting the average rate as the vibration rate of the reference shaft 61A and the vibration rate of the superimposition shaft 61B.

By executing any of the above processes (M1-1) to (M1-3), the vibration calculation units 22A and 22B obtain the vibration rate of the reference shaft 61A, the vibration rate of the superimposition shaft 61B, and the main shaft rotation speed. The vibration calculation unit 22A sends the vibration rate of the reference shaft 61A to the vibration generation unit 24A, and the vibration calculation unit 22B sends the vibration rate of the superimposition shaft 61B to the vibration generation unit 24B. The vibration calculation unit 22A or the vibration calculation unit 22B sends the main shaft rotation speed to the combining unit 27.

The difference calculation unit 23B reads the amplitude of the reference shaft 61A and the amplitude of the superimposition shaft 61B from the shared area 345. The difference calculation unit 23B calculates an amplitude difference. The amplitude difference is the difference between the amplitude of the superimposition shaft 61B and the amplitude of the reference shaft 61A (step S150). The difference calculation unit 23B further subtracts the amplitude difference from the amplitude of the superimposition shaft 61B (step S160). The difference calculation unit 23B sends the calculation result, namely the amplitude of the superimposition shaft 61B, to the vibration generation unit 24B.

When the amplitude of the superimposition shaft 61B is larger than the amplitude of the reference shaft 61A, the difference is a positive value, which means that the positive amplitude value is subtracted from the amplitude of the superimposition shaft 61B. This makes the amplitude of the superimposition shaft 61B smaller than the initial one.

In contrast, when the amplitude of the superimposition shaft 61B is smaller than the amplitude of the reference shaft 61A, the difference is a negative value, which means that the negative amplitude value is subtracted from the amplitude of the superimposition shaft 61B. This makes the amplitude of the superimposition shaft 61B larger than the initial one.

In summary, the difference calculation unit 23B calculates a third amplitude, i.e. the amplitude for vibrating the tool post 65B, on the basis of the amplitude difference obtained by subtracting the first amplitude from the second amplitude. The first amplitude is the amplitude of the reference shaft 61A, and the second amplitude is the amplitude of the superimposition shaft 61B.

The vibration generation unit 24B generates a superimposition vibration waveform on the basis of the vibration rate of the superimposition shaft 61B sent from the vibration calculation unit 22B and the amplitude of the superimposition shaft 61B sent from the difference calculation unit 23B.

The vibration generation unit 24A generates a reference vibration waveform on the basis of the vibration rate of the reference shaft 61A and the amplitude of the reference shaft 61A sent from the vibration calculation unit 22B.

The vibration generation unit 24A sends the generated reference vibration waveform to the combining unit 27, and the vibration generation unit 24B sends the generated superimposition vibration waveform to the combining unit 27. The combining unit 27 calculates a combined movement amount for the reference shaft 61A by combining the reference vibration waveform and the movement amount obtained as the result of the interpolation processing on the movement conditions for the reference shaft 61A. The combining unit 27 also calculates a combined movement amount for the superimposition shaft 61B by combining the superimposition vibration waveform and the movement amount obtained as the result of the interpolation processing on the movement conditions for the superimposition shaft 61B.

On the basis of the combined movement amount for the reference shaft 61A, the acceleration/deceleration processing unit 39 generates a speed command directed to the reference shaft 61A. On the basis of the combined movement amount for the superimposition shaft 61B, the acceleration/deceleration processing unit 39 generates a speed command directed to the superimposition shaft 61B. The acceleration/deceleration processing unit 39 also generates a rotation speed command corresponding to the main shaft rotation speed. The acceleration/deceleration processing unit 39 sends, to the axis data output unit 40, the rotation speed command directed to the main shaft 60, the speed command for the reference shaft 61A, and the speed command directed to the superimposition shaft 61B. Accordingly, the axis data output unit 40 outputs commands such as the rotation speed command and the speed commands to the drive unit 90 (step S170).

As a result, the vibration operation of the Z2 axis is controlled in accordance with the vibration rate of the superimposition shaft 61B calculated and set by the vibration calculation unit 22B where the method (M1-1) is used. The rotation of the main shaft 60 is controlled in accordance with the main shaft rotation speed calculated and set by the vibration calculation unit 22A.

For the machine tool 110, specifically, the first spindle 75 rotates the workpiece 70 at the main shaft rotation speed calculated by the vibration calculation unit 22A, and the tool post 65B vibrates the tool 66B at the vibration rate calculated by the vibration calculation unit 22B. In this case, the tool post 65A vibrates the tool 66A without the vibration rate being changed.

The vibration operation of the Z1 axis is controlled in accordance with the vibration rate of the reference shaft 61A calculated and set by the vibration calculation unit 22A where the method (M1-2) is used. The rotation of the main shaft 60 is controlled in accordance with the main shaft rotation speed calculated and set by the vibration calculation unit 22B.

For the machine tool 110, specifically, the first spindle 75 rotates the workpiece 70 at the main shaft rotation speed calculated by the vibration calculation unit 22B, and the tool post 65A vibrates the tool 66A at the vibration rate calculated by the vibration calculation unit 22A. In this case, the tool post 65B vibrates the tool 66B without the vibration rate being changed.

Where the method (M1-3) is used, the operation of the Z1 axis is controlled in accordance with the vibration rate of the reference shaft 61A set by the vibration calculation unit 22A, and the vibration operation of the Z2 axis is controlled in accordance with the vibration rate of the superimposition shaft 61B set by the vibration calculation unit 22B. The rotation of the main shaft 60 is controlled in accordance with the main shaft rotation speed calculated by the vibration calculation unit 22A or the vibration calculation unit 22B.

For the machine tool 110, specifically, the first spindle 75 rotates the workpiece 70 at the main shaft rotation speed calculated by the vibration calculation unit 22A or the vibration calculation unit 22B. The tool post 65A vibrates the tool 66A at the vibration rate calculated by the vibration calculation unit 22A, and the tool post 65B vibrates the tool 66B at the vibration rate calculated by the vibration calculation unit 22B.

Note that the vibration calculation units 22A and 22B may execute all the processes (M1-1) to (M1-3) in step S140. In this case, the vibration calculation units 22A and 22B select, from among the calculation results of (M1-1) to (M1-3), the main shaft rotation speed having a small difference from the initial main shaft rotation speed.

Which of (M1-1) to (M1-3) should be employed may be set in advance in the numerical control device 1. Alternatively, the user may select which of (M1-1) to (M1-3) should be employed. The vibration calculation units 22A and 22B may select (M1-1) or (M1-2) in accordance with the side that executes a G165 command first. That is, in a case where a G165 command is executed on the reference shaft 61A first, the vibration calculation units 22A and 22B apply (M1-1), and in a case where a G165 command is executed on the superimposition shaft 61B first, the vibration calculation units 22A and 22B apply (M1-2).

In summary, the control computation unit 2 controls the reference shaft 61A, the superimposition shaft 61B, and the main shaft 60 by changing at least one of the vibration rate of the reference shaft 61A, the vibration rate of the superimposition shaft 61B, and the main shaft rotation speed.

Figure 5:
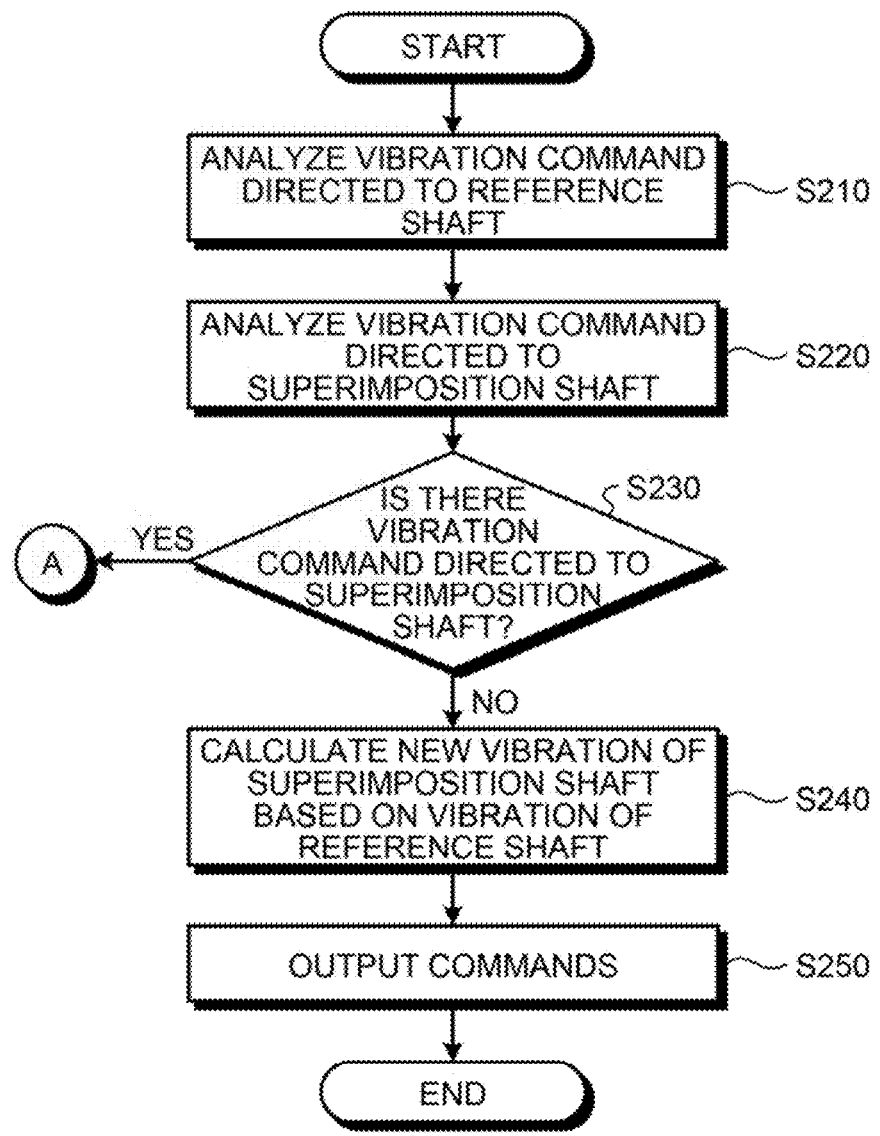
FIG. 5 is a flowchart illustrating a procedure for a second control process by the numerical control device according to the first embodiment.

In some case, the machining program 81 may contain only a vibration command directed to the reference shaft 61A, without containing vibration commands directed to the superimposition shaft 61B. The procedure in such a case will be described. FIG. 5 is a flowchart illustrating a procedure for a second control process by the numerical control device according to the first embodiment. The second control process of FIG. 5 is a control process for setting a vibration rate for the superimposition shaft 61B in the absence of a vibration command directed to the superimposition shaft 61B.

The following description is made as to a process for outputting the same command from the numerical control device 1 to the reference shaft 61A and to the superimposition shaft 61B when there is no a vibration command directed to the superimposition shaft 61B in the machining program 81.

Because steps S210 and S220 in FIG. 5 are the same as steps S110 and S120, the description thereof will be omitted.

On the basis of whether vibration conditions for the superimposition shaft 61B have been generated by the vibration command analysis unit 11B, the vibration check unit 25A determines whether there is a vibration command directed to the superimposition shaft 61B (step S230). On the basis of whether vibration conditions for the reference shaft 61A have been generated by the vibration command analysis unit 11A, the vibration check unit 25B determines whether there is a vibration command directed to the reference shaft 61A.

Because there is a vibration command directed to the reference shaft 61A, the vibration check unit 25B notifies the vibration calculation units 22A and 22B that there is a vibration command directed to the reference shaft 61A. Accordingly, the vibration calculation units 22A and 22B read the vibration conditions of the reference shaft 61A from the shared area 345.

When there is a vibration command directed to the superimposition shaft 61B (step S230: Yes), the vibration check unit 25A notifies the vibration calculation units 22A and 22B that there is a vibration command directed to the superimposition shaft 61B. Accordingly, the vibration calculation units 22A and 22B read the vibration conditions of the superimposition shaft 61B from the shared area 345. After that, the numerical control device 1 executes step S130 and subsequent steps described in FIG. 4.

In contrast, when there is no vibration command directed to the superimposition shaft 61B (step S230: No), the vibration check unit 25A notifies the vibration calculation units 22A and 22B and the difference calculation unit 23B that there is no vibration command directed to the superimposition shaft 61B. Accordingly, both the vibration calculation units 22A and 22B read the vibration information on the reference shaft 61A. The vibration information includes the vibration rate and the amplitude. Then, the vibration calculation unit 22A calculates new vibration information on the reference shaft 61A and a new main shaft rotation speed on the basis of the vibration information on the reference shaft 61A. The vibration calculation unit 22B calculates new vibration information on the superimposition shaft 61B on the basis of the vibration information on the reference shaft 61A. As described above, the vibration calculation unit 22B calculates the vibration of the superimposition shaft 61B on the basis of the vibration of the reference shaft 61A in the absence of a vibration command directed to the superimposition shaft 61B (step S240). Note that the difference calculation unit 23B does not calculate an amplitude difference.

After that, a process similar to the process described with reference to the flowchart of FIG. 4 is executed, such that commands directed to the drive unit 90 are generated and output to the drive unit 90 (step S250).

Note that the vibration check unit 25A may notify the combining unit 27 that there is no vibration command directed to the superimposition shaft 61B. In this case, the combining unit 27 sets, as the superimposition vibration waveform, the same waveform as the reference vibration waveform sent from the vibration generation unit 24A, and then combines the superimposition vibration waveform and the movement amount for the superimposition shaft 61B.

In some case, the machining program 81 may contain only a vibration command for the superimposition shaft 61B, without containing vibration commands directed to the reference shaft 61A. In such a case, the numerical control device 1 applies the vibration conditions of the superimposition shaft 61B to the vibration conditions of the reference shaft 61A through the procedure similar to that illustrated in the flowchart of FIG. 5 described above. Note that the numerical control device 1 may determine in step S230 of FIG. 5 whether there are both a vibration command directed to the superimposition shaft 61B and a vibration command directed to the reference shaft 61A.

In the absence of a vibration command directed to the superimposition shaft 61B in the machining program 81, the numerical control device 1 may output a vibration command only to the reference shaft 61A. The procedure in such a case will be described.

Figure 6:
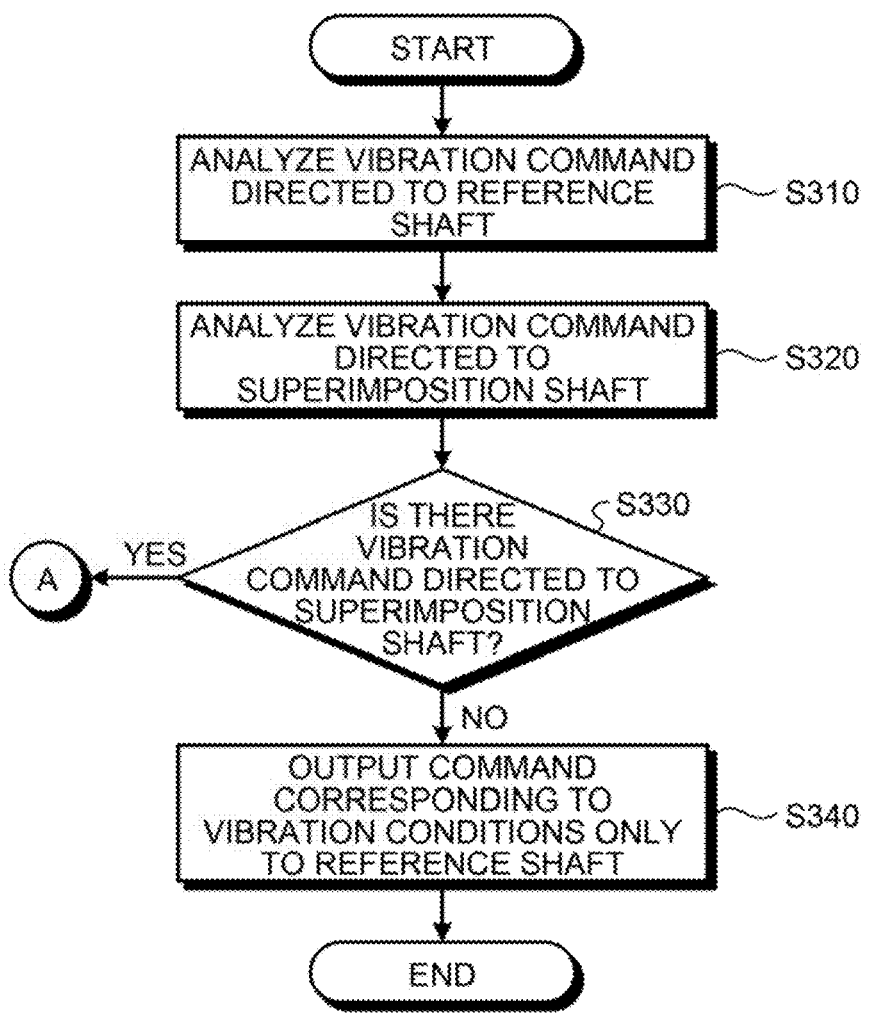
FIG. 6 is a flowchart illustrating a procedure for a third control process by the numerical control device according to the first embodiment.

FIG. 6 is a flowchart illustrating a procedure for a third control process by the numerical control device according to the first embodiment. The following description is made as to a process for outputting a vibration command from the numerical control device 1 only to the reference shaft 61A in the absence of a vibration command directed to the superimposition shaft 61B in the machining program 81. The third control process of FIG. 6 is a control process for vibrating only the reference shaft 61A in the absence of a vibration command directed to the superimposition shaft 61B.

Because steps S310 to S330 in FIG. 6 are the same as steps S210 to S230 in FIG. 5, the description thereof will be omitted. When there is no vibration command directed to the superimposition shaft 61B in step S330 (step S330: No), the vibration check unit 25A notifies the vibration calculation units 22A and 22B and the difference calculation unit 23B that there is no vibration command directed to the superimposition shaft 61B. In this case, the vibration calculation unit 22B does not read the vibration conditions of the reference shaft 61A and does not calculate the vibration conditions of the superimposition shaft 61B. On the basis of the vibration conditions of the reference shaft 61A, the vibration calculation unit 22A calculates a new main shaft rotation speed and a new vibration rate for the reference shaft 61A for superimposition control.

After that, a process similar to the process described with reference to the flowchart of FIG. 4 is executed, such that commands directed to the drive unit 90 are generated and output to the drive unit 90. In this case, the axis data output unit 40 outputs, only to the reference shaft 61A, a speed command corresponding to vibration conditions (step S340), without outputting, to the superimposition shaft 61B, a speed command corresponding to vibration conditions. In other words, the axis data output unit 40 outputs, only to the reference shaft 61A, a speed command corresponding to movement conditions and vibration conditions, and outputs, to the superimposition shaft 61B, a speed command corresponding to movement conditions.

In some case, the machining program 81 may contain only a vibration command directed to the superimposition shaft 61B, without containing vibration commands directed to the reference shaft 61A. The numerical control device 1 applies the vibration conditions of the superimposition shaft 61B to the vibration conditions of the reference shaft 61A through the procedure similar to that illustrated in the flowchart of FIG. 6 described above.

Executing the process described with reference to FIG. 5 allows the reference shaft 61A and the superimposition shaft 61B to perform the same vibration operation and movement operation. In contrast, executing the process described with reference to FIG. 6 allows the reference shaft 61A and the superimposition shaft 61B to perform the same movement operation as the superimposition shaft 61B does not vibrate.

Which of the process described with reference to FIG. 5 and the process described with reference to FIG. 6 should be executed may be set in advance in the numerical control device 1. Alternatively, the user may select which should be employed. Which of the process described with reference to FIG. 5 and the process described with reference to FIG. 6 should be executed may be determined using any method. The process described with reference to FIG. 5 and the process described with reference to FIG. 6 may be specified using parameters, for example, or may be specified in the machining program 81.

Similarly to the tool post 65B, the tool post 65A may be moved and vibrated in a combined direction of two axial directions. In this case, the tool post 65A moves and vibrates in a combined direction of the X1-axis direction and the Z1-axis direction, that is, an interpolation direction in which the X1-axis direction and the Z1-axis direction are used.

As described above, according to the first embodiment, the vibration to the superimposition shaft 61B is changed in accordance with the vibration to the reference shaft 61A, or the vibration to the reference shaft 61A is changed in accordance with the vibration to the superimposition shaft 61B. As a result, even when different vibration conditions are set for the reference shaft 61A and the superimposition shaft 61B, desired vibration can be simultaneously performed on the reference shaft 61A and the superimposition shaft 61B. Therefore, the numerical control device 1 can cause the reference shaft 61A and the superimposition shaft 61B to execute desired low-frequency vibration cutting even when superimposition control is performed. In addition, different parts of the workpiece 70 are machined simultaneously, which is advantageous in shortening the machining time.

Second Embodiment

Next, the second embodiment of the present invention will be described with reference to FIGS. 7 to 30. In the second embodiment, superimposition control and low-frequency vibration cutting control are performed on a one-spindle two-post lathe including a reference shaft on the headstock.

Figures 7, 8:
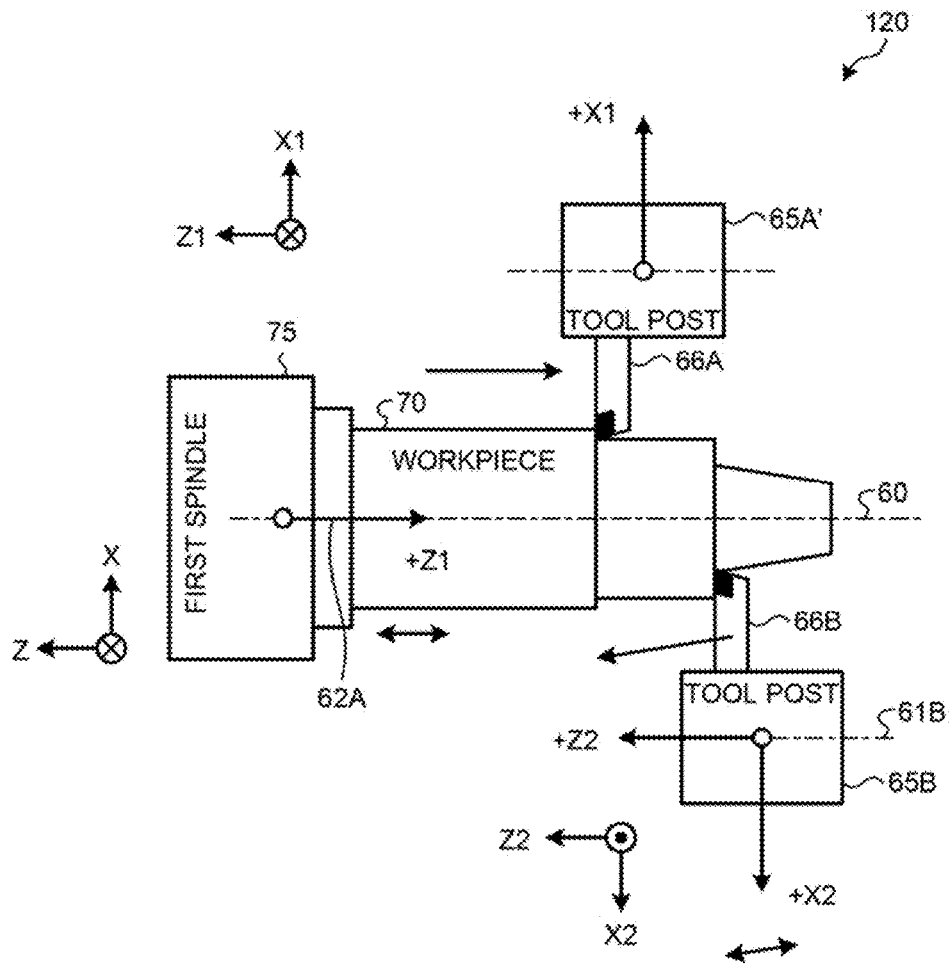
FIG. 7 is a diagram illustrating a configuration of a machine tool according to a second embodiment.
FIG. 8 is a diagram illustrating an example of a machining program for use in a numerical control device according to the second embodiment.

FIG. 7 is a diagram illustrating a configuration of a machine tool according to the second embodiment. In FIG. 7, similarly to FIG. 2, the horizontal direction on the sheet of FIG. 7 is the Z-axis direction, and the vertical direction on the sheet of FIG. 7 is the X-axis direction. Components illustrated in FIG. 7 that achieve the same functions as those of the machine tool 110 of the first embodiment illustrated in FIG. 2 are denoted by the same reference signs, and duplicate descriptions are omitted.

The machine tool 120 according to the second embodiment is a one-spindle two-post lathe. An example of the machine tool 120 is an automatic lathe. In the machine tool 120, the rotation axis of the workpiece 70, which provided by the first spindle 75, is the main shaft 60, and the Z1 axis for moving the main shaft 60 in the Z-axis direction is a reference shaft 62A.

The machine tool 120 includes a tool post 65A', which is the first tool post, and the tool post 65B, which is the second tool post. The tool post 65A' is the first tool post, and the tool post 65B is the second tool post. The superimposition shaft 61B is provided on the tool post 65B. The tool post 65A' is movable in the X1-axis direction, and the tool post 65B is movable in the X2-axis direction and the Z2-axis direction. The workpiece 70 is movable in the Z1-axis direction. Note that although the positive direction of the Z1-axis of FIG. 7 is opposite to that of the Z1-axis depicted in FIG. 2, the Z1-axis may take any positive direction aligned with the rotation axis. Thus, in the machine tool 120, the Z1 axis is the reference shaft 62A and the Z2 axis is the superimposition shaft 61B. Note that in the machine tool 120, the superimposition shaft 61B may be provided on the tool post 65A'.

The tool post 65A' is a swivel tool post similar to the tool post 65A. The tool post 65A' differs from the tool post 65A in that the tool post 65A' moves only in the X1-axis direction without moving in the Z1-axis direction.

In the machine tool 120, the first spindle 75 vibrates the workpiece 70 in the Z1-axis direction, and the tool post 65B vibrates the tool 66B in the Z2-axis direction, whereby the tools 66A and 66B perform vibration cutting machining on the workpiece 70.

Vibration constraint conditions for the machine tool 120 are (L2-1) to (L2-3) below.

(L2-1) The main shaft rotation speed during vibration cutting must be the same for the reference shaft 62A and the superimposition shaft 61B.

(L2-2) The vibration rates of the tools 66A and 66B during one rotation of the main shaft 60 must be the same for the reference shaft 62A and the superimposition shaft 61B.

(L2-3) The vibration amplitudes may be different for the reference shaft 62A and the superimposition shaft 61B. However, the superimposition shaft 61B must be vibrated in consideration of the vibration of the reference shaft 62A.

The reason why (L2-2) specifies that the vibration rates must be the same for the reference shaft 62A and the superimposition shaft 61B is that the vibration of the reference shaft 62A is transmitted to the superimposition shaft 61B in the machine tool 120 because the workpiece 70 vibrates. In the machine tool 120, if the vibration rates are not the same for the reference shaft 62A and the superimposition shaft 61B, the vibration of the superimposition shaft 61B does not have a fixed-shape wave such as a sine wave or a triangular wave.

The reason why (L2-3) specifies that the superimposition shaft 61B must be vibrated in consideration of the vibration of the reference shaft 62A is that the vibration of the reference shaft 62A is transmitted to the superimposition shaft 61B in the machine tool 120 because the workpiece 70 vibrates.

FIG. 8 is a diagram illustrating an example of a machining program for use in the numerical control device according to the second embodiment. Some commands of the machining program 82P are the same as those of the machining program 81 described with reference to FIG. 3 of the first embodiment, and the description thereof will be omitted.

The machining program 82P is used when the numerical control device 1 controls the machine tool 120. Therefore, the machining program 82P includes a machining program 820A for the reference shaft 62A and a machining program 820B for the superimposition shaft 61B.

G165 in the machining program 820A is a low-frequency vibration command directed to the workpiece 70 in the direction of the reference shaft 62A. Therefore, in a case where G165 is used in the machining program 820A for the reference shaft 62A, the workpiece 70 is vibrated in the direction of the reference shaft 62A at the amplitude and vibration rate specified by G165. The illustrated example indicates that the tool 66A is vibrated at an amplitude of 0.2 mm and a vibration rate of 2.5 during one rotation of the main shaft 60. The machining program 820B for the superimposition shaft 61B indicates that the tool 66B is vibrated at an amplitude of 0.3 mm and a vibration rate of 4.5 during one rotation of the main shaft 60. In the machining program 820A, M3 S1=1200 indicates that the main shaft rotation speed command directed to the main shaft 60 is 1200 rotations.

In a case where the machining program 82P is used, the vibration calculation unit uses any of the following methods (M2-1) to (M2-3) to calculate a vibration rate and a main shaft rotation speed that define a changed vibration rate and a changed main shaft rotation speed. As a result, each axis is controlled by the changed vibration rate and the changed main shaft rotation speed.

(M2-1) Method for Matching the Vibration Rate of the Superimposition Shaft 61B to the Vibration Rate of the Reference Shaft 62A In this case, the vibration calculation unit 22B changes the vibration rate of the superimposition shaft 61B from D=4.5 to D=2.5 that is the vibration rate of the reference shaft 62A. The vibration calculation unit 22B further calculates, from D=2.5 that is the vibration rate of the superimposition shaft 61B and S1=1200 that is the main shaft rotation speed command directed to the main shaft 60, a main shaft rotation speed that can synchronize with the vibration rates of the reference shaft 62A and the superimposition shaft 61B. The vibration calculation unit 22B calculates the main shaft rotation speed, using information in the numerical control device 1. The main shaft rotation speed calculated by the vibration calculation unit 22B is the actual main shaft rotation speed for vibration cutting. In a case where a plurality of candidates for the main shaft rotation speed are available, the vibration calculation unit 22B employs one close to the initial main shaft rotation speed of 1200 (times/min). For example, the main shaft rotation speed calculated by the vibration calculation unit 22B can be 1227 (times/min).

(M2-2) Method for Matching the Vibration Rate of the Reference Shaft 62A to the Vibration Rate of the Superimposition Shaft 61B In this case, the vibration calculation unit 22A changes the vibration rate of the reference shaft 62A from D=2.5 to D=4.5 that is the vibration rate of the superimposition shaft 61B. The vibration calculation unit 22A further calculates, from D=4.5 that is the vibration rate of the reference shaft 62A and S1=1200 that is the main shaft rotation speed command directed to the main shaft 60, a main shaft rotation speed that can synchronize with the vibration rates of the reference shaft 62A and the superimposition shaft 61B. The vibration calculation unit 22A calculates the main shaft rotation speed, using information in the numerical control device 1. The main shaft rotation speed calculated by the vibration calculation unit 22A is the actual main shaft rotation speed for vibration cutting. In a case where a plurality of candidates for the main shaft rotation speed are available, the vibration calculation unit 22A employs one close to the initial main shaft rotation speed of 1200 (times/min). For example, the main shaft rotation speed calculated by the vibration calculation unit 22A can be 1250 (times/min). Note that the main shaft rotation speed may be calculated by the vibration calculation unit 22B.

(M2-3) Method for Averaging the Vibration Rate of the Reference Shaft 62A and the Vibration Rate of the Superimposition Shaft 61B The average of the vibration rate of the reference shaft 62A and the vibration rate of the superimposition shaft 61B may be calculated by either the vibration calculation unit 22A or the vibration calculation unit 22B. The following description gives an example in which the average of the vibration rate of the reference shaft 62A and the vibration rate of the superimposition shaft 61B is calculated by the vibration calculation unit 22A.

The vibration calculation unit 22A calculates an average rate by taking the average of D=2.5 and D=4.5. D=2.5 is the vibration rate of the reference shaft 62A, and D=4.5 is the vibration rate of the superimposition shaft 61B. The resultant average rate is 3.5. The vibration calculation unit 22A sets the calculation result as the vibration rate of the reference shaft 62A and the vibration rate of the superimposition shaft 61B. The vibration calculation unit 22A sends the vibration rate of the superimposition shaft 61B to the vibration calculation unit 22B.

The vibration calculation unit 22A also calculates a main shaft rotation speed that can synchronize with the calculated average rate of 3.5. The vibration calculation unit 22A calculates the main shaft rotation speed, using information in the numerical control device 1. In a case where a plurality of candidates for the main shaft rotation speed are available, the vibration calculation unit 22A employs one close to the initial main shaft rotation speed of 1200 (times/min). For example, the main shaft rotation speed calculated by the vibration calculation unit 22A can be 1205 (times/min).

Figure 9:
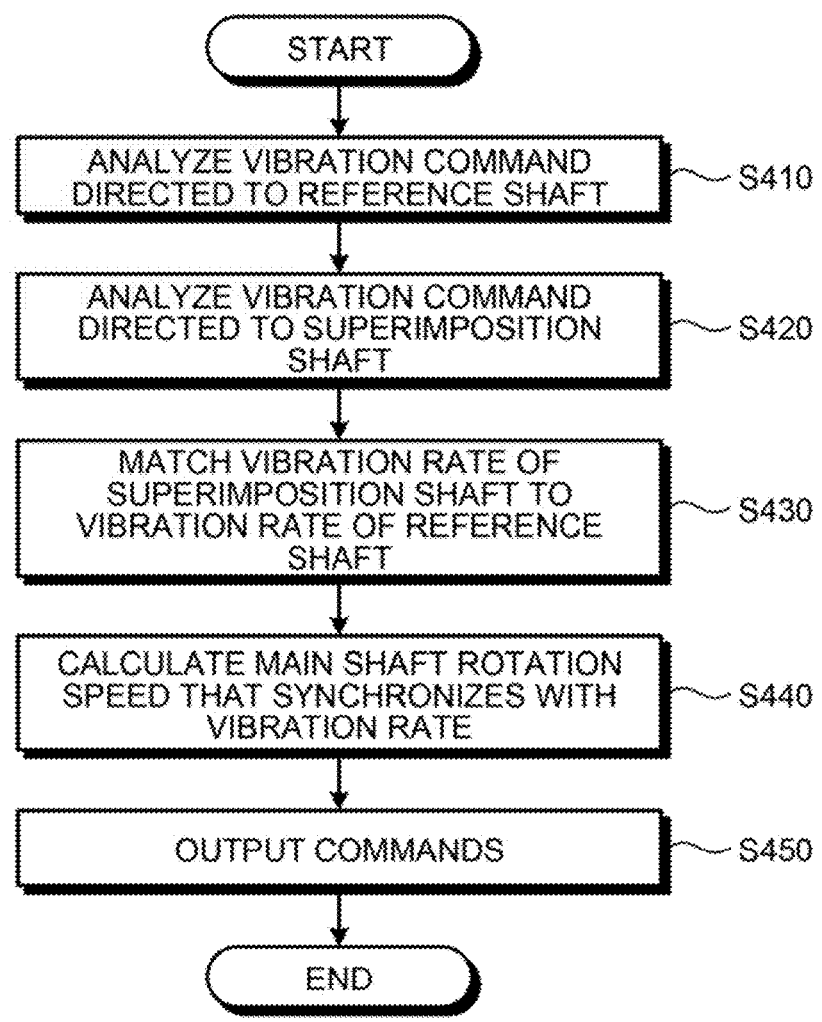
FIG. 9 is a flowchart illustrating a procedure for a first control process by the numerical control device according to the second embodiment.

Next, a procedure for controlling the machine tool 120 will be described. FIG. 9 is a flowchart illustrating a procedure for a first control process by the numerical control device according to the second embodiment. FIG. 9 represents a procedure for controlling the machine tool 120 by the numerical control device 1. The first control process of FIG. 9 is a control process for matching the vibration rate of the superimposition shaft 61B to the vibration rate of the reference shaft 62A.

Because steps S410 to S420 in FIG. 9 are the same as steps S110 to S120 in FIG. 4, the description thereof will be omitted. The analysis processing unit 37 sends the analysis result such as vibration conditions to the interpolation processing unit 38.

The vibration calculation unit 22B executes steps S430 and S440, using the above-described method (M2-1). That is, the vibration calculation unit 22B matches the vibration rate of the superimposition shaft 61B to the vibration rate of the reference shaft 62A (step S430). Then, on the basis of the vibration rate obtained in step S430 and the initial main shaft rotation speed, the vibration calculation unit 22B calculates a main shaft rotation speed that can synchronize with the vibration rates of the reference shaft 62A and the superimposition shaft 61B (step S440). Note that the vibration calculation unit 22B may calculate the vibration rate of the reference shaft 62A and the vibration rate of the superimposition shaft 61B, using the above-described process (M2-2).

After that, a process similar to the process described with reference to the flowchart of FIG. 4 is executed, such that the vibration generation unit 24A generates a reference vibration waveform, and the vibration generation unit 24B generates a superimposition vibration waveform. Then, a process similar to step S170 of FIG. 4 is executed, such that the axis data output unit 40 outputs a main shaft rotation speed command and speed commands to the drive unit 90 (step S450).

As a result, the vibration operation of the Z2 axis is controlled in accordance with the vibration rate of the superimposition shaft 61B calculated and set by the vibration calculation unit 22B where the method (M2-1) is used. The rotation of the main shaft 60 is controlled in accordance with the main shaft rotation speed calculated by the vibration calculation unit 22B.

The vibration operation of the Z1 axis is controlled in accordance with the vibration rate of the reference shaft 62A calculated and set by the vibration calculation unit 22A where the method (M2-2) is used. The rotation of the main shaft 60 is controlled in accordance with the main shaft rotation speed calculated by the vibration calculation unit 22A.

Note that, the above-described process (M2-3) may be executed in step S430, such that the vibration calculation unit 22B averages the vibration rate of the reference shaft 62A and the vibration rate of the superimposition shaft 61B. The procedure therefor will be described.

Figure 10:
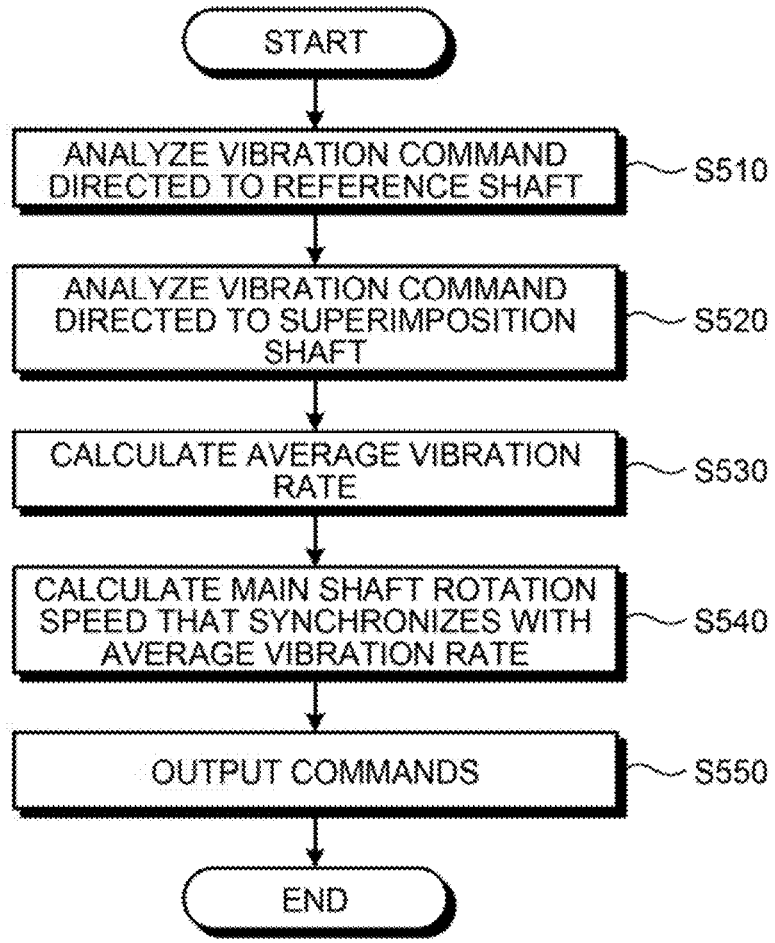
FIG. 10 is a flowchart illustrating a procedure for a second control process by the numerical control device according to the second embodiment.

FIG. 10 is a flowchart illustrating a procedure for a second control process by the numerical control device according to the second embodiment. The second control process of FIG. 10 is a control process for setting the average of the vibration rate of the superimposition shaft 61B and the vibration rate of the reference shaft 62A to the superimposition shaft 61B and the reference shaft 62A. Because steps S510 to S520 in FIG. 10 are the same as steps S110 to S120 in FIG. 4, the description thereof will be omitted.

The vibration command analysis unit 11A stores the vibration conditions of the reference shaft 62A in the shared area 345, and the vibration command analysis unit 11B stores the vibration conditions of the superimposition shaft 61B in the shared area 345.

The vibration calculation unit 22B executes steps S530 and S540, using the above-described process (M2-3). That is, the vibration calculation unit 22B calculates an average vibration rate by taking the average of the vibration rate of the reference shaft 62A and the vibration rate of the superimposition shaft 61B (step S530). Then, on the basis of the vibration rate obtained in step S530 and the initial main shaft rotation speed, the vibration calculation unit 22B calculates a main shaft rotation speed that can synchronize with the average vibration rate (step S540). Note that the calculations in steps S530 and S540 may be performed by the vibration calculation unit 22A.

After that, a process similar to the process described with reference to the flowchart of FIG. 4 is executed, such that the vibration generation unit 24A generates a reference vibration waveform, and the vibration generation unit 24B generates a superimposition vibration waveform. Then, a process similar to step S170 of FIG. 4 is executed, such that the axis data output unit 40 outputs a main shaft rotation speed command and speed commands to the drive unit 90 (step S550).

The vibration operation of the Z1 axis and the Z2 axis is controlled in accordance with the average vibration rate where the method (M2-3) is used. The rotation of the main shaft 60 is controlled in accordance with the main shaft rotation speed calculated by the vibration calculation unit 22A or the vibration calculation unit 22B.

Note that the vibration calculation units 22A and 22B may execute all the processes (M2-1) to (M2-3) in steps S430 and S530. In this case, the vibration calculation units 22A and 22B select, from among the calculation results of (M2-1) to (M2-3), the main shaft rotation speed having a small difference from the initial main shaft rotation speed.

Which of (M2-1) to (M2-3) should be employed may be set in advance in the numerical control device 1. Alternatively, the user may select which of (M2-1) to (M2-3) should be adopted. The vibration calculation units 22A and 22B may select (M2-1) or (M2-2) in accordance with the side that executes a G165 command first. That is, in a case where a G165 command is executed on the reference shaft 62A first, the vibration calculation units 22A and 22B apply (M2-1). In a case where a G165 command is executed on the superimposition shaft 61B first, the vibration calculation units 22A and 22B apply (M2-2).

In some case, the machining program 82P may contain only a vibration command for the reference shaft 62A, without containing vibration commands directed to the superimposition shaft 61B. Alternatively, the machining program 82P may contain only a vibration command directed to the superimposition shaft 61B, without containing vibration commands directed to the reference shaft 62A. In these cases, the numerical control device 1 performs a process similar to that described with reference to FIG. 5 of the first embodiment.

A method for calculating an amplitude difference on the basis of the amplitude for the reference shaft 62A and the amplitude for the superimposition shaft 61B will be described. An amplitude difference is the difference between the amplitude specified by a vibration condition for the superimposition shaft 61B (e.g. command amplitude P1$b$ described later) and the amplitude specified by a vibration condition for the reference shaft 62A (e.g. command amplitude P1$a$ described later). The following separately describes two cases: the amplitude of the reference shaft 62A is smaller than the amplitude of the superimposition shaft 61B; and the amplitude of the superimposition shaft 61B is equal to or smaller than the amplitude of the reference shaft 62A.

First case: (command amplitude P1$a$ of the reference shaft 62A)<(command amplitude P1$b$ of the superimposition shaft 61B)

Figure 11:
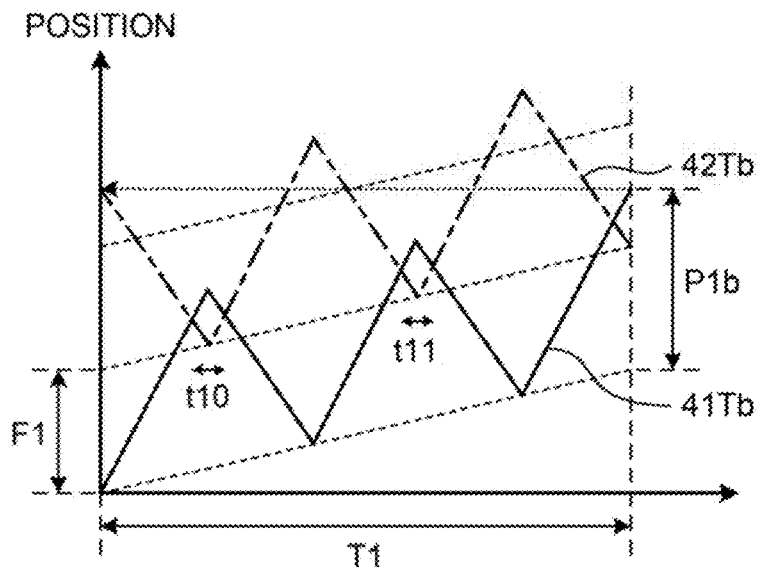
FIG. 11 is a diagram illustrating a first example of a vibration command for a superimposition shaft of the machine tool according to the second embodiment.
Figure 12:
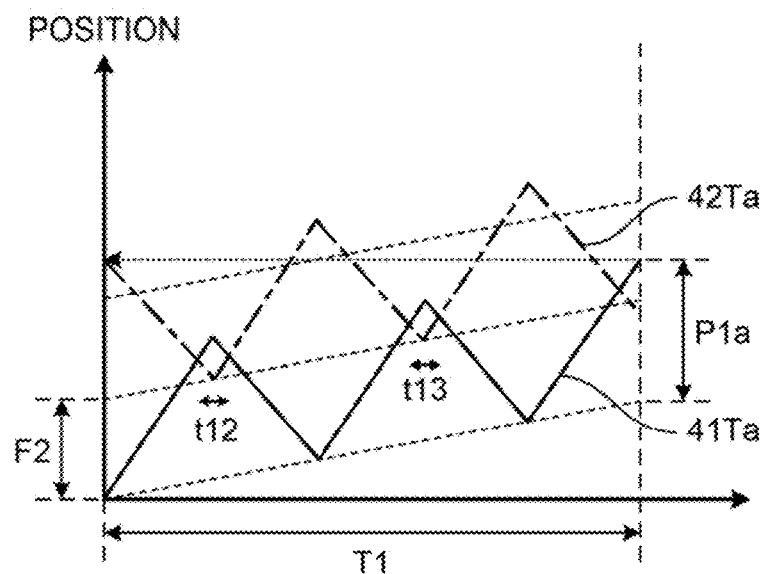
FIG. 12 is a diagram illustrating a first example of a vibration command for a reference shaft of the machine tool according to the second embodiment.

FIG. 11 is a diagram illustrating a first example of a vibration command directed to the superimposition shaft of the machine tool according to the second embodiment, and FIG. 12 is a diagram illustrating a first example of a vibration command directed to the reference shaft of the machine tool according to the second embodiment. The horizontal axis of the graphs illustrated in FIGS. 11 and 12 is the rotation angle of the main shaft 60. A time T1 is the time required for the main shaft 60 to make one rotation. The vertical axis of the graph illustrated in FIG. 11 is the position of the superimposition shaft 61B in the Z2-axis direction. The vertical axis of the graph illustrated in FIG. 12 is the position of the reference shaft 62A in the Z1-axis direction. In FIG. 11, the positive orientation of the vertical axis corresponds to the positive orientation of the Z2 axis. In FIG. 12, the positive direction of the vertical axis in FIG. 12 corresponds to the positive direction of the Z1 axis.

The waveforms 41Tb and 42Tb illustrated in FIG. 11 are vibration waveforms corresponding to the vibration command directed to the superimposition shaft 61B. The waveforms 41Ta and 42Ta illustrated in FIG. 12 are vibration waveforms corresponding to the vibration command directed to the reference shaft 62A. For convenience of explanation, the waveforms 41Tb and 42Tb will be described as the vibration waveform of the tool 66B, and the waveforms 41Ta and 42Ta will be described as the vibration waveform of the tool 66A.

For the machine tool 120, as illustrated in FIGS. 11 and 12, the vibration rates of the tools 66A and 66B during one rotation of the main shaft 60 must be the same for the reference shaft 62A and the superimposition shaft 61B. The illustrated example indicates that the vibration rates of the tools 66A and 66B are 2.5.

In FIG. 11, the feed of the tool 66B in the Z2-axis direction during one rotation of the main shaft 60 is denoted by the feed F1. The feed F1 corresponds to the speed at which the workpiece 70 is machined in the Z2-axis direction by the tool 66B.

In FIG. 12, the feed of the tool 66A in the Z1-axis direction during one rotation of the main shaft 60 is denoted by the feed F2. The feed F2 corresponds to the speed at which the workpiece 70 is machined in the Z1-axis direction by the tool 66A.

As illustrated in FIG. 11, the tool 66B moves taking the waveform 41Tb during the first rotation of the main shaft 60, and moves taking the waveform 42Tb during the second rotation of the main shaft 60. In this case, the waveform 41Tb and the waveform 42Tb overlap in the time slots t10 and t11. These time slots t10 and t11 occur during the second rotation of the main shaft 60. In these time slots t10 and t11, the position already machined during the first rotation of the main shaft 60 is not machined during the second rotation of the main shaft 60. The position already machined during the first rotation of the main shaft 60 is the part of the workpiece 70 which has already been machined into a chip, and this position is not machined during the second rotation of the main shaft 60. This indicates that the chip is separated. In this way, the position machined during the first rotation of the main shaft 60 is air-cut in the time slots t10 and t11 during the second rotation of the main shaft 60, whereby the chip is separated from the workpiece 70 in each of the time slots t10 and t11. This enables fine discharge of chips from the workpiece 70.

As for the waveforms 41Ta and 42Ta illustrated in FIG. 12, similarly, the waveforms 41Ta and 42Ta overlap in the time slots t12 and t13. The tool 66A does not come into contact with the workpiece 70 in the time slots t12 and t13, as in the time slots t10 and t11, enabling fine discharge of chips from the workpiece 70.

Because the feed F1 of the tool 66B is larger than the feed F2 of the tool 66A, the command amplitude P1$b$ of the superimposition shaft 61B is larger than the command amplitude P1$a$ of the reference shaft 62A. In this case, subtracting the command amplitude P1$a$ of the reference shaft 62A from the command amplitude P1$b$ of the superimposition shaft 61B calculates the amplitude difference (positive value) between the superimposition shaft 61B and the reference shaft 62A.

Figure 13:
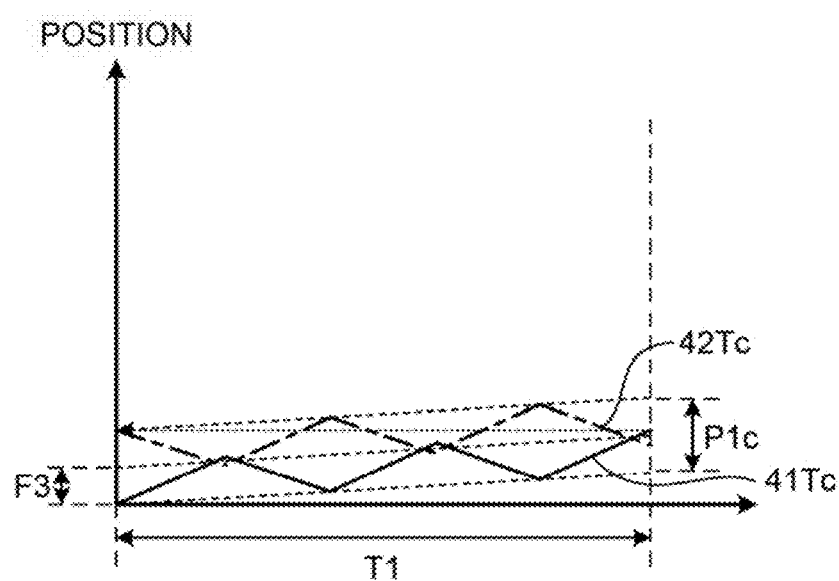
FIG. 13 is a diagram illustrating vibration waveforms calculated from the vibration commands of FIGS. 11 and 12.

FIG. 13 is a diagram illustrating vibration waveforms calculated from the vibration commands of FIGS. 11 and 12. The waveforms 41Tc and 42Tc illustrated in FIG. 13 are vibration waveforms corresponding to the difference obtained by subtracting the waveforms 41Ta and 42Ta of the reference shaft 62A from the waveforms 41Tb and 42Tb of the superimposition shaft 61B. Therefore, the difference amplitude P1$c$ illustrated in FIG. 13 corresponds to the command amplitude P1$b$ minus the command amplitude P1$a$. The feed F3 illustrated in FIG. 13 is the feed of the tool 66B vibrated taking the waveforms 41Tc and 42Tc, and is set on the basis of the difference amplitude P1$c$. As described above, in the case of (command amplitude P1$a$ of the reference shaft 62A)<(command amplitude P1$b$ of the superimposition shaft 61B), the amplitude difference between the superimposition shaft 61B and the reference shaft 62A has a positive value.

If the command amplitude P1$b$ is a fixed value, and the feed F1 becomes too fast, the waveform 41Tb and the waveform 42Tb do not overlap, which results in no time slots t10 and t11. In this case, the workpiece 70 and the tool 66B do not separate from each other, which makes chip separation impossible. For this reason, when the feed F1 is increased, the command amplitude P1$b$ should be increased in accordance with the feed F1. As a result, chips can be separated even when the feed F1 is fast.

Second case: (command amplitude P1$a$ of the reference shaft 62A)≥(command amplitude P1$b$ of the superimposition shaft 61B)

Figure 14:
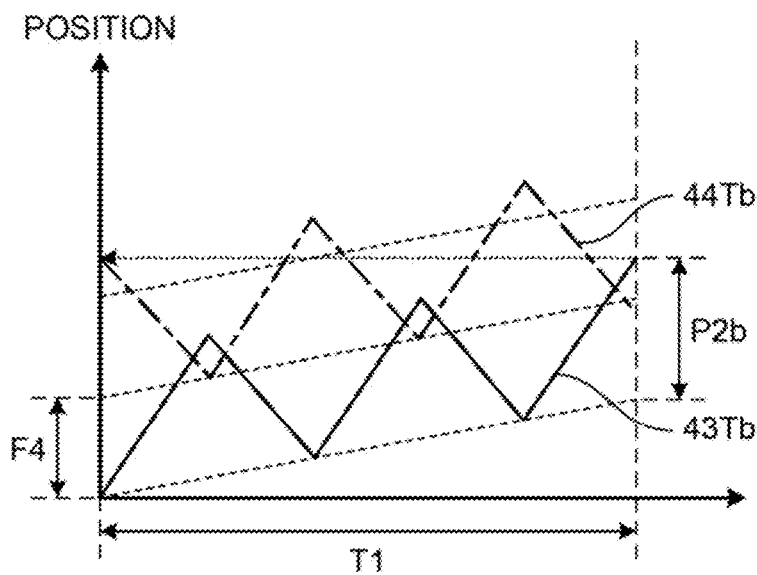
FIG. 14 is a diagram illustrating a second example of a vibration command directed to the superimposition shaft of the machine tool according to the second embodiment.
Figure 15:
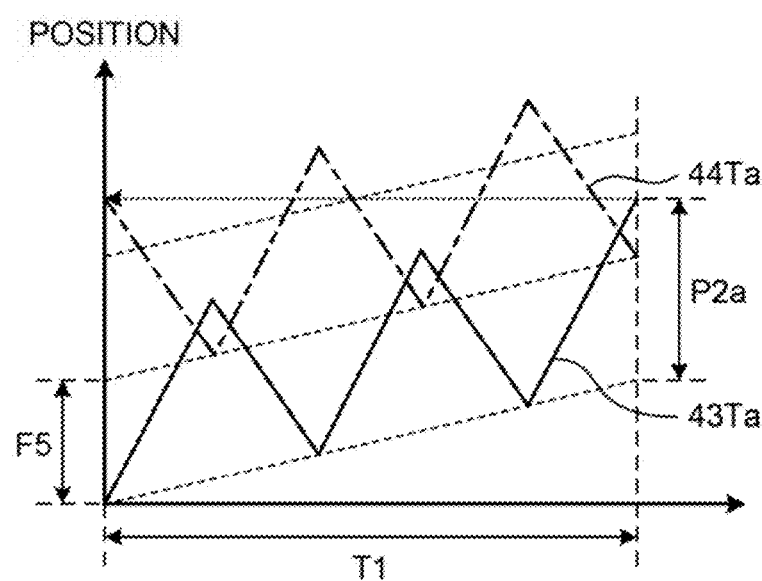
FIG. 15 is a diagram illustrating a second example of a vibration command directed to the reference shaft of the machine tool according to the second embodiment.

FIG. 14 is a diagram illustrating a second example of a vibration command directed to the superimposition shaft of the machine tool according to the second embodiment, and FIG. 15 is a diagram illustrating a second example of a vibration command directed to the reference shaft of the machine tool according to the second embodiment. The graph illustrated in FIG. 14 is a graph similar to the graph illustrated in FIG. 11, and the graph illustrated in FIG. 15 is a graph similar to the graph illustrated in FIG. 12.

The waveforms 43Tb and 44Tb illustrated in FIG. 14 are vibration waveforms corresponding to the vibration command directed to the superimposition shaft 61B, and the waveforms 43Ta and 44Ta illustrated in FIG. 15 are vibration waveforms corresponding to the vibration command directed to the reference shaft 62A.

In FIG. 14, the feed of the tool 66B in the Z2-axis direction during one rotation of the main shaft 60 is denoted by the feed F4. In FIG. 15, the feed of the tool 66A in the Z1-axis direction during one rotation of the main shaft 60 is denoted by the feed F5.

Here, because the feed F4 of the tool 66B is smaller than the feed F5 of the tool 66A, the command amplitude P2$b$ of the superimposition shaft 61B is smaller than the command amplitude P2$a$ of the reference shaft 62A. In this case, subtracting the command amplitude P2$a$ of the reference shaft 62A from the command amplitude P2$b$ of the superimposition shaft 61B calculates the amplitude difference (negative value) between the superimposition shaft 61B and the reference shaft 62A.

Figure 16:
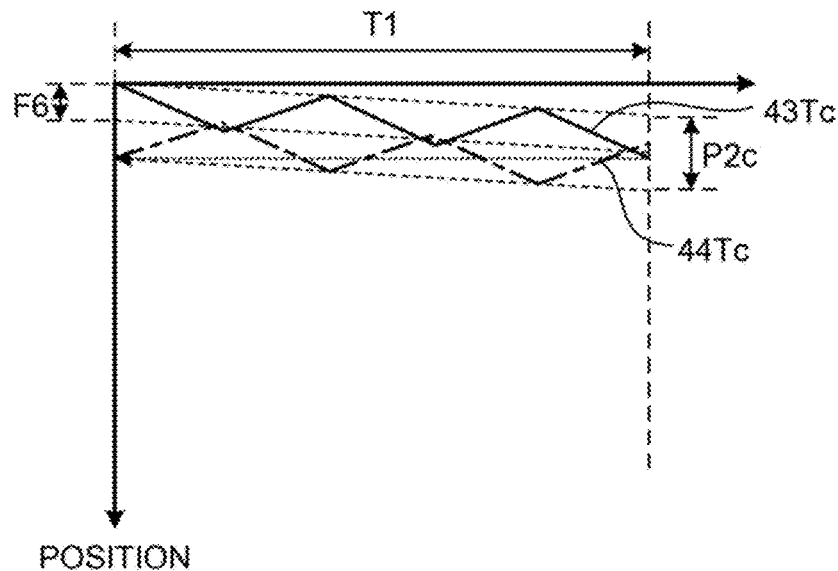
FIG. 16 is a diagram illustrating vibration waveforms calculated from the vibration commands of FIGS. 14 and 15.

FIG. 16 is a diagram illustrating vibration waveforms calculated from the vibration commands of FIGS. 14 and 15. The waveforms 43Tc and 44Tc illustrated in FIG. 16 are vibration waveforms corresponding to the difference obtained by subtracting the waveforms 43Ta and 44Ta of the reference shaft 62A from the waveforms 43Tb and 44Tb of the superimposition shaft 61B. Therefore, the difference amplitude P2$c$ illustrated in FIG. 16 corresponds to the command amplitude P2$b$ minus the command amplitude P2$a$. The feed F6 illustrated in FIG. 16 is the feed of the tool 66B vibrated taking the waveforms 43Tc and 44Tc, and is set on the basis of the difference amplitude P2$c$. As described above, in the case of (command amplitude P2$a$ of the reference shaft 62A)≥(command amplitude P2$b$ of the superimposition shaft 61B), the difference between the superimposition shaft 61B and the reference shaft 62A has a negative value.

In the case of superimposition control, the actual vibration operation of the superimposition shaft 61B corresponds to both the vibration command directed to the superimposition shaft 61B and the vibration command directed to the reference shaft 62A. Therefore, how to actually vibrate the superimposition shaft 61B is determined in accordance with the amplitude specified by a vibration condition for the reference shaft 62A (hereinafter referred to as the command amplitude Qa) and the amplitude specified by a vibration condition for the superimposition shaft 61B (hereinafter referred to as the command amplitude Qb). The command amplitudes Qa and Qb correspond to the amplitudes specified by the vibration commands (G165) of the machining program 82P. How to vibrate the superimposition shaft 61B in accordance with the command amplitudes Qa and Qb will be described with reference to FIGS. 17 to 24.

The following separately describes four cases with reference to FIGS. 17 to 24: the command amplitude Qb and the command amplitude Qa are the same; the command amplitude Qb is zero; the command amplitude Qb is larger than the command amplitude Qa; and the command amplitude Qb is smaller than the command amplitude Qa. Note that in FIGS. 17 to 24, the vibration direction of the tool 66B is the axial direction of the superimposition shaft 61B. The horizontal axis of the graphs illustrated in FIGS. 18, 20, 22, and 24 is the rotation angle of the main shaft 60, and a time T2 is the time required for the main shaft 60 to make one rotation. Further, the vertical axis of the graphs illustrated in FIGS. 18, 20, 22, and 24 indicates the position of the tool 66B in the Z2-axis direction, and the positive direction of the vertical axis corresponds to the feed direction of the workpiece 70. Note that the feed direction of the workpiece 70 is the positive direction of the Z2 axis (positive direction of the Z1 axis). Therefore, the tools 66A and 66B proceed with the machining in the negative direction of the Z2 axis (negative direction of the Z1 axis).

Figure 17:
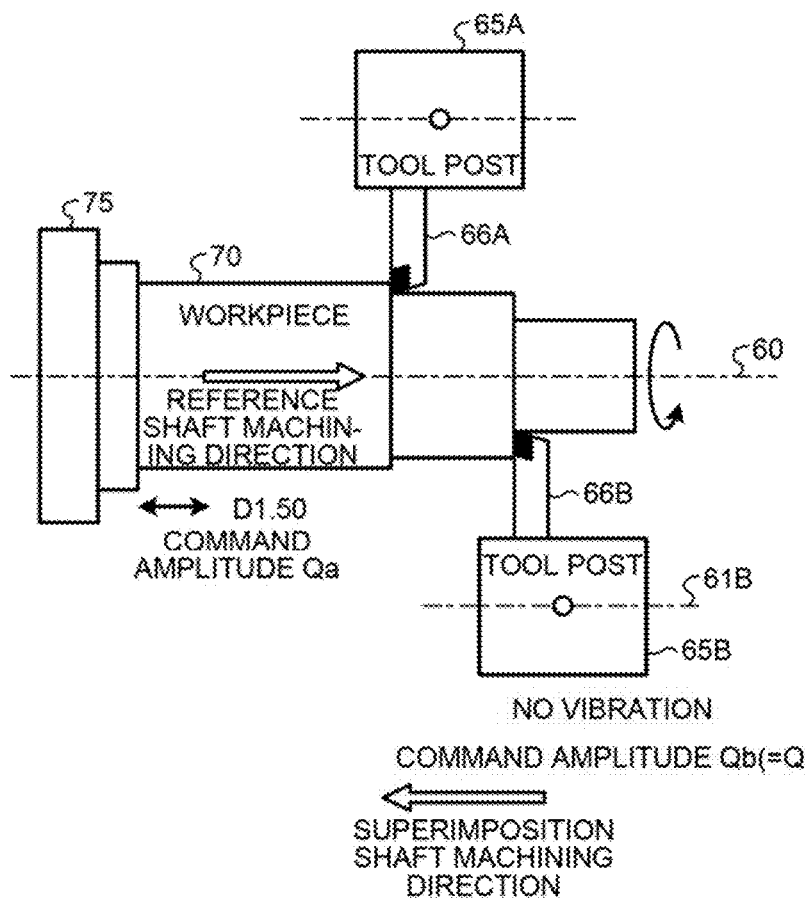
FIG. 17 is a diagram for explaining a first vibration operation of the machine tool according to the second embodiment.
Figure 18:
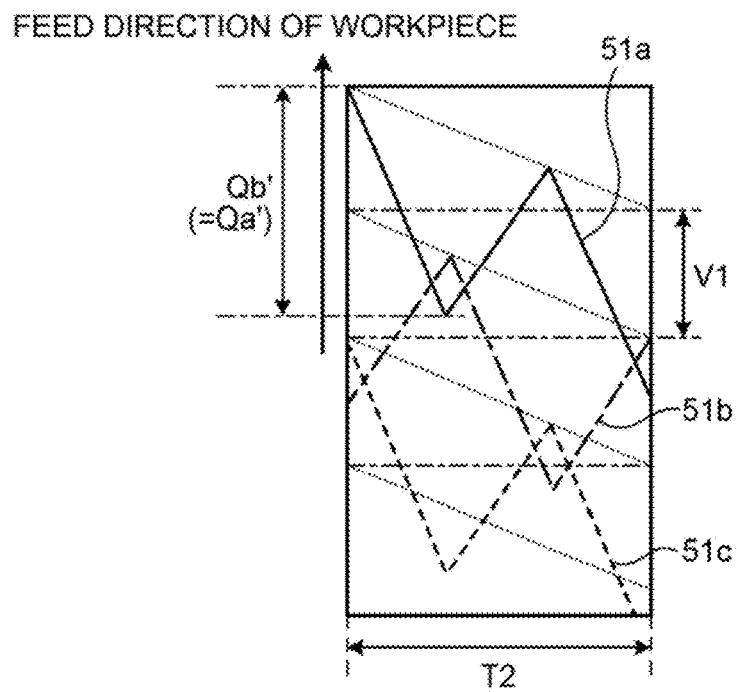
FIG. 18 is a diagram illustrating the first vibration operation of the superimposition shaft relative to the reference shaft of the machine tool according to the second embodiment.

FIG. 17 is a diagram for explaining a first vibration operation of the machine tool according to the second embodiment. FIG. 18 is a diagram illustrating the first vibration operation of the superimposition shaft relative to the reference shaft of the machine tool according to the second embodiment. FIGS. 17 and 18 depict the vibration operation of the superimposition shaft 61B that is performed when the command amplitude Qb for the superimposition shaft 61B is the same as the command amplitude Qa for the reference shaft 62A (Qb=Qa).

In order to perform superimposition control under a condition where no movement command is directed to the superimposition shaft 61B and the command amplitude Qb is equal to the command amplitude Qa (command amplitude Qb=command amplitude Qa), the headstock holding the main shaft 60 should be vibrated in the direction of the reference shaft 62A, with the tool post 65B for the superimposition shaft 61B fixed. As a result, the movement paths 51a to 51c of the tool post 65B correspond to the vibration operation of the reference shaft 62A, so that the superimposition shaft 61B can perform vibration cutting with the same amplitude as the reference shaft 62A.

In FIG. 18, the distance by which the tool post 65B moves during one rotation of the main shaft 60 is denoted by the movement distance V1, and the actual amplitude of the tool post 65B is denoted by the amplitude Qb'. The movement distance V1 corresponds to the actual movement speed of the tool post 65B. The actual movement speed of the tool post 65B is the movement speed for tool feed, and does not include any movement resulting from vibration. That is, the movement distance V1 of the tool post 65B corresponds to the movement speed specified by the movement condition. Therefore, the faster the movement speed specified by the movement condition, the larger the movement distance V1. The actual amplitude Qb' corresponds to the command amplitude Qb specified by the vibration condition.

Figure 19:
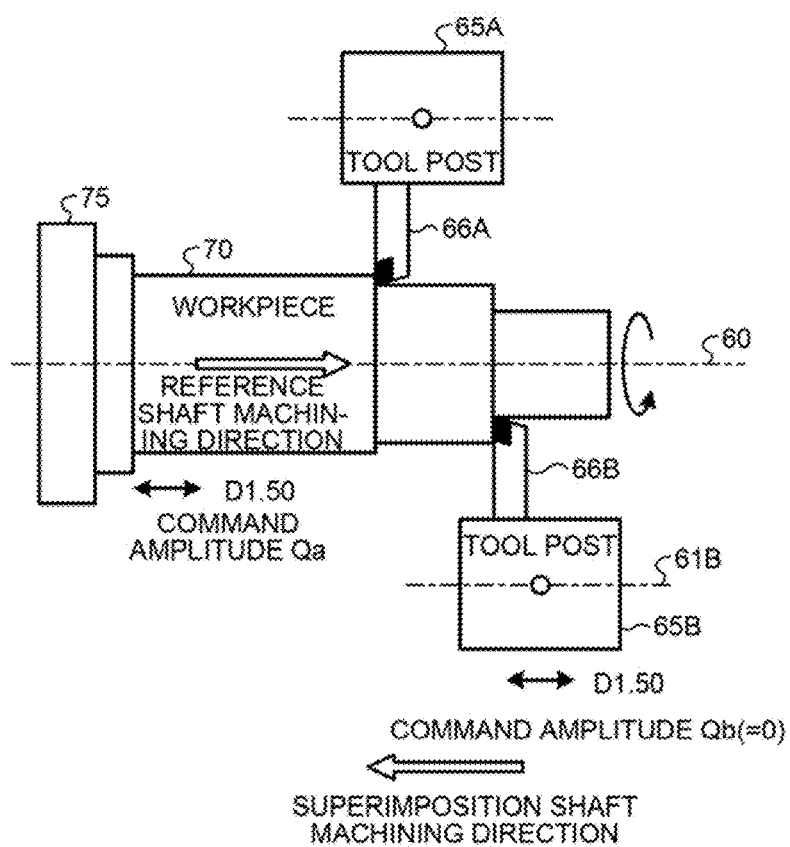
FIG. 19 is a diagram for explaining a second vibration operation of the machine tool according to the second embodiment.
Figure 20:
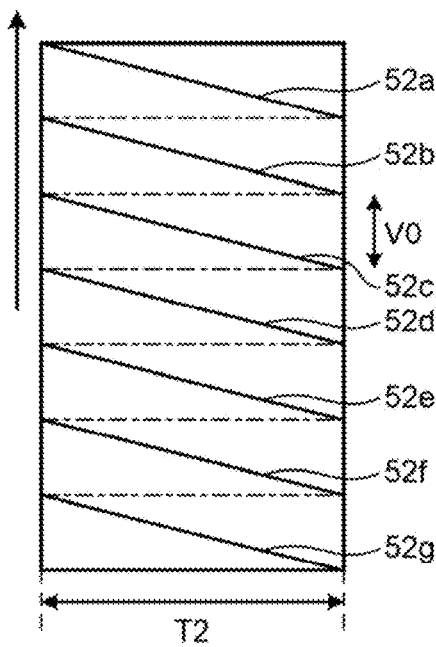
FIG. 20 is a diagram illustrating the second vibration operation of the superimposition shaft relative to the reference shaft of the machine tool according to the second embodiment.

FIG. 19 is a diagram for explaining a second vibration operation of the machine tool according to the second embodiment. FIG. 20 is a diagram illustrating the second vibration operation of the superimposition shaft relative to the reference shaft of the machine tool according to the second embodiment. FIGS. 19 and 20 depict the operation of the superimposition shaft 61B that is performed when the command amplitude Qb for the superimposition shaft 61B is zero.

In order to perform superimposition control under the condition where command amplitude Qb is zero (command amplitude Qb=0), the tool post 65B for the superimposition shaft 61B should be vibrated in synchronization with the vibration of the headstock for the reference shaft 62A. As a result, the tool post 65B can perform vibration-free cutting. In other words, when the tool post 65B for the superimposition shaft 61B is vibrated in the same manner as the headstock for the reference shaft 62A under superimposition control, the tool post 65B and the workpiece 70 perform the same vibration operation, whereby the tool 66B on the tool post 65B can perform vibration-free cutting. Therefore, the movement paths 52a to 52g of the tool post 65B are cutting paths for the tool post 65B to move in the feed direction of the workpiece 70 without vibration. In FIG. 20, the distance by which the tool post 65B moves during one rotatin of the main shaft 60 is denoted by the movement distance V0. The movement distance V0 corresponds to the actual movement speed of the tool post 65B.

Figure 21:
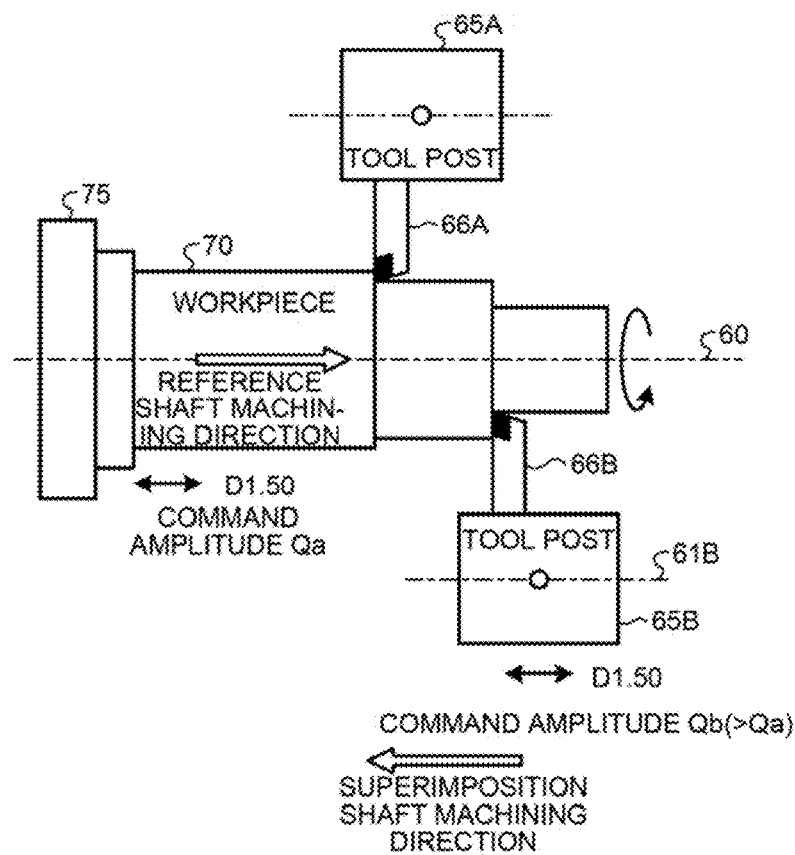
FIG. 21 is a diagram for explaining a third vibration operation of the machine tool according to the second embodiment.
Figure 22:
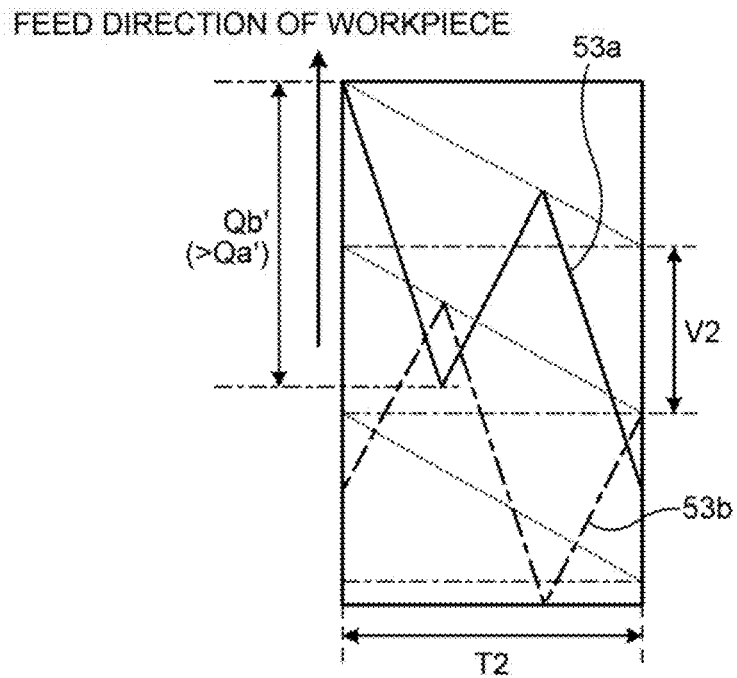
FIG. 22 is a diagram illustrating the third vibration operation of the superimposition shaft relative to the reference shaft of the machine tool according to the second embodiment.

FIG. 21 is a diagram for explaining a third vibration operation of the machine tool according to the second embodiment. FIG. 22 is a diagram illustrating the third vibration operation of the superimposition shaft relative to the reference shaft of the machine tool according to the second embodiment. FIGS. 21 and 22 depict the vibration operation of the superimposition shaft 61B that is performed when the command amplitude Qb for the superimposition shaft 61B is larger than the command amplitude Qa for the reference shaft 62A.

In order to perform superimposition control under the condition where the command amplitude Qb is larger than the command amplitude Qa (command amplitude Qb>command amplitude Qa), the tool post 65B for the superimposition shaft 61B should be vibrated in the opposite phase to the vibration of the headstock for the reference shaft 62A. As a result, the movement paths 53a and 53b of the tool post 65B correspond to the vibration operation of the reference shaft 62A and the superimposition shaft 61B, so that the superimposition shaft 61B can perform vibration cutting with a larger amplitude than the reference shaft 62A. Note that the actual amplitude of the tool post 65B is the amplitude Qb' corresponding to the command amplitude Qb minus the amplitude Qa' corresponding to the command amplitude Qa.

In FIG. 22, the distance by which the tool post 65B moves during one rotatin of the main shaft 60 is denoted by the movement distance V2, and the actual amplitude of the tool post 65B is denoted by the amplitude Qb'. The movement distance V2 corresponds to the actual movement speed of the tool post 65B. That is, the movement distance V2 of the tool post 65B corresponds to the movement speed specified by the movement condition. The actual amplitude Qb' corresponds to the command amplitudes Qa and Qb specified by the vibration conditions.

Figure 23:
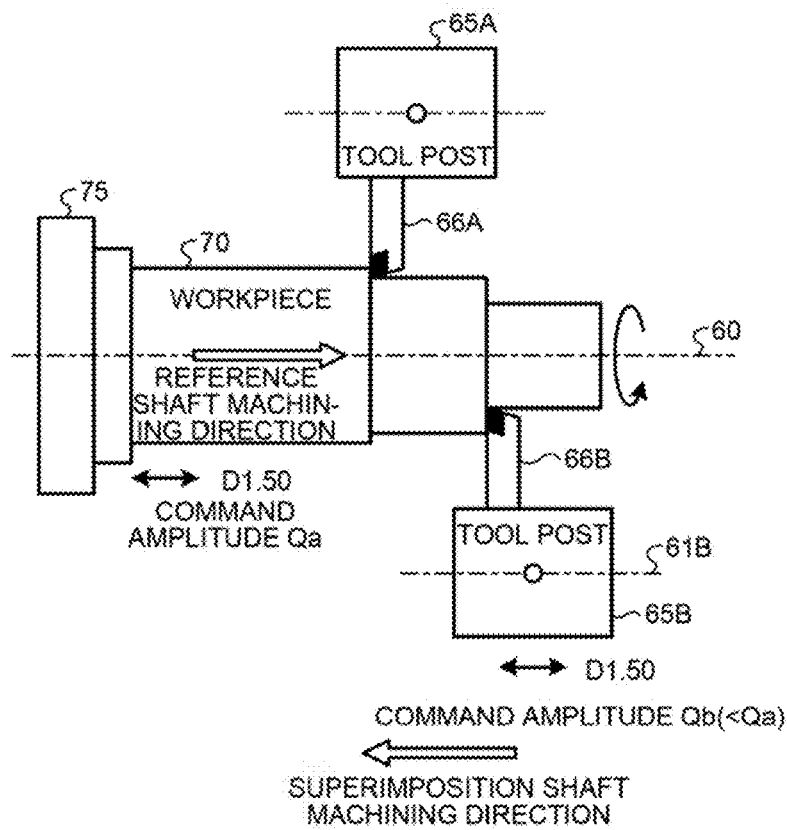
FIG. 23 is a diagram for explaining a fourth vibration operation of the machine tool according to the second embodiment.
Figure 24:
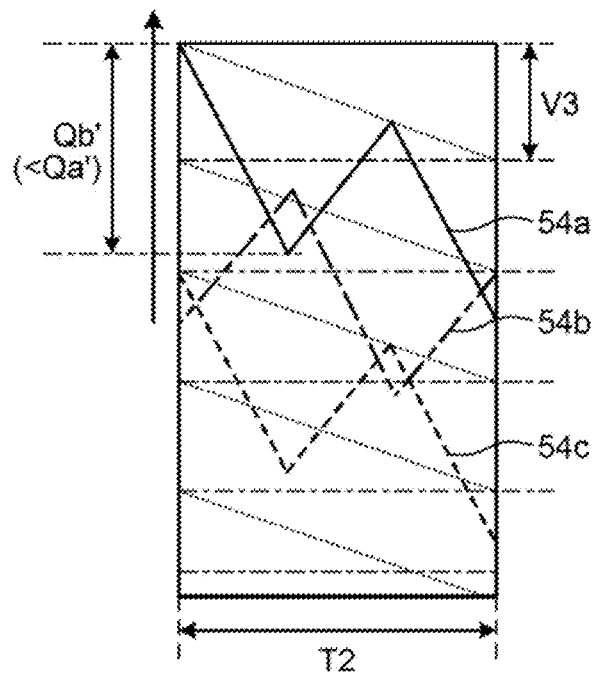
FIG. 24 is a diagram illustrating the fourth vibration operation of the superimposition shaft relative to the reference shaft of the machine tool according to the second embodiment.

FIG. 23 is a diagram for explaining a fourth vibration operation of the machine tool according to the second embodiment. FIG. 24 is a diagram illustrating the fourth vibration operation of the superimposition shaft relative to the reference shaft of the machine tool according to the second embodiment. FIG. 24 depicts the vibration operation of the superimposition shaft 61B that is performed when the command amplitude Qb for the superimposition shaft 61B is smaller than the command amplitude Qa for the reference shaft 62A.

In order to perform superimposition control under the condition where command amplitude Qb is smaller than the command amplitude Qa (command amplitude Qb<command amplitude Qa), the tool post 65B for the superimposition shaft 61B should be vibrated in the same phase as the vibration of the headstock for the reference shaft 62A. As a result, the movement paths 54a and 54c of the tool post 65B correspond to the vibration operation of the reference shaft 62A and the superimposition shaft 61B, so that the superimposition shaft 61B can perform vibration cutting with a smaller amplitude than the reference shaft 62A. The actual amplitude of the tool post 65B is the amplitude Qa' corresponding to the command amplitude Qa minus the amplitude Qb' corresponding to the command amplitude Qb.

In FIG. 24, the distance by which the tool post 65B moves during one rotation of the main shaft 60 is denoted by the movement distance V3, and the actual amplitude of the tool post 65B is denoted by the amplitude Qb'. The movement distance V3 corresponds to the actual movement speed of the tool post 65B. That is, the movement distance V3 of the tool post 65B corresponds to the movement speed specified by the movement condition. The actual amplitude Qb' corresponds to the command amplitudes Qa and Qb specified by the vibration conditions.

In the present embodiment, on the basis of the relationship between the command amplitudes Qa and Qb, the numerical control device 1 calculates a vibration command directed to the superimposition shaft 61B for performing superimposition control. As a result, the tool post 65B executes any of the command operations illustrated in FIGS. 17 to 20.

In the present embodiment, the vibration waveform is a triangular wave. However, the vibration waveform is not limited to a triangular wave, and may be a waveform different from a triangular wave, such as a sine wave, a square wave, a trapezoidal wave, or a sawtooth wave.

Figure 25:
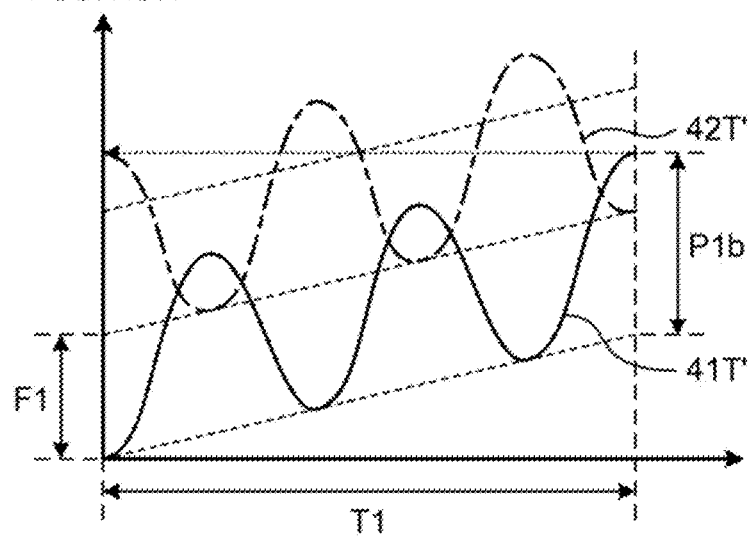
FIG. 25 is a diagram illustrating a sine wave vibration command according to the second embodiment.

FIG. 25 is a diagram illustrating a sine wave vibration command according to the second embodiment. FIG. 25 illustrates an example of a vibration command directed to the superimposition shaft 61B of the machine tool 120. Sine waves such as the sine waves 41T' and 42T' are vibration waveforms that can directly specify an ideal vibration shape. Therefore, sine waves can create an ideal vibration shape if commands are sufficiently followed by feedback. The vibration waveform in the first embodiment and the third embodiment described later may also be any of a triangular wave, a sine wave, a square wave, a trapezoidal wave, and a sawtooth wave.

In the present embodiment, the vibration rate and the main shaft rotation speed are calculated and set using any of the methods (M2-1) to (M2-3). However, a vibration command directed to the superimposition shaft 61B may be subtracted from a vibration command directed to the reference shaft 62A, and the result of the subtraction may be output to the superimposition shaft 61B.

FIG. 26 is a diagram illustrating another example of a machining program for use in the numerical control device according to the second embodiment. Some commands of the machining program 82Q are the same as those of the machining program 82P or the machining program 81 described with reference to FIG. 3 of the first embodiment, and the description thereof will be omitted.

The machining program 82Q is used when the numerical control device 1 controls the machine tool 120, similarly to the machining program 82P. Therefore, the machining program 82Q includes a machining program 821A for the reference shaft 62A and a machining program 821B for the superimposition shaft 61B.

In the machining program 821A, M3 S1=1000 indicates that the main shaft rotation speed command directed to the main shaft 60 is 1000 rotations. In a case where the machining program 82Q is used, the vibration calculation unit 22B of the numerical control device 1 subtracts the waveform of the vibration command directed to the superimposition shaft 61B from the waveform of the vibration command directed to the reference shaft 62A, and applies the result of the subtraction to the vibration command directed to the superimposition shaft 61B. The numerical control device 1 also calculates a main shaft rotation speed that synchronizes with the vibration rates of the reference shaft 62A and the superimposition shaft 61B.

Next, a procedure for operating the superimposition shaft 61B with a command obtained by subtracting a reference vibration waveform from a superimposition vibration waveform will be described. FIG. 27 is a flowchart illustrating a procedure for a third control process by the numerical control device according to the second embodiment. FIG. 27 represents a procedure for controlling the machine tool 120 by the numerical control device 1. The third control process of FIG. 27 is a control process for operating the superimposition shaft 61B with a command obtained by subtracting the waveform of a vibration command directed to the superimposition shaft 61B from the waveform of a vibration command directed to the reference shaft 62A.

Because steps S561 to S562 in FIG. 27 are the same as steps S110 to S120 in FIG. 4, the description thereof will be omitted. The analysis processing unit 37 sends the analysis result, namely the waveform of the vibration command directed to the reference shaft 62A and the waveform of the vibration command directed to the superimposition shaft 61B, to the interpolation processing unit 38.

The vibration calculation unit 22B calculates a command by subtracting the waveform of the vibration command directed to the superimposition shaft 61B from the waveform of the vibration command directed to the reference shaft 62A. That is, the vibration calculation unit 22B calculates (vibration command directed to the reference shaft 62)−(vibration command directed to the superimposition shaft 61B) (step S563). Then, on the basis of the command of the vibration waveform obtained in step S563 and the main shaft rotation speed, the vibration calculation unit 22B calculates a main shaft rotation speed that can synchronize with the vibration rates of the reference shaft 62A and the superimposition shaft 61B (step S564).

After that, a process similar to the process described with reference to the flowchart of FIG. 4 is executed, such that the vibration generation unit 24A generates a reference vibration waveform, and the vibration generation unit 24B generates a superimposition vibration waveform. Then, a process similar to step S170 of FIG. 4 is executed, such that the axis data output unit 40 outputs a main shaft rotation speed command and speed commands to the drive unit 90 (step S565).

Figure 28:
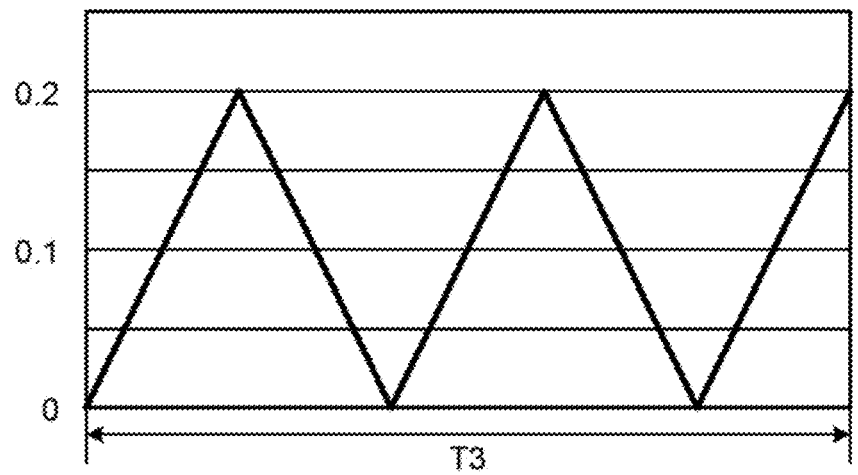
FIG. 28 is a diagram illustrating the waveform of the vibration command directed to the reference shaft corresponding to the machining program of FIG. 26.
Figure 29:
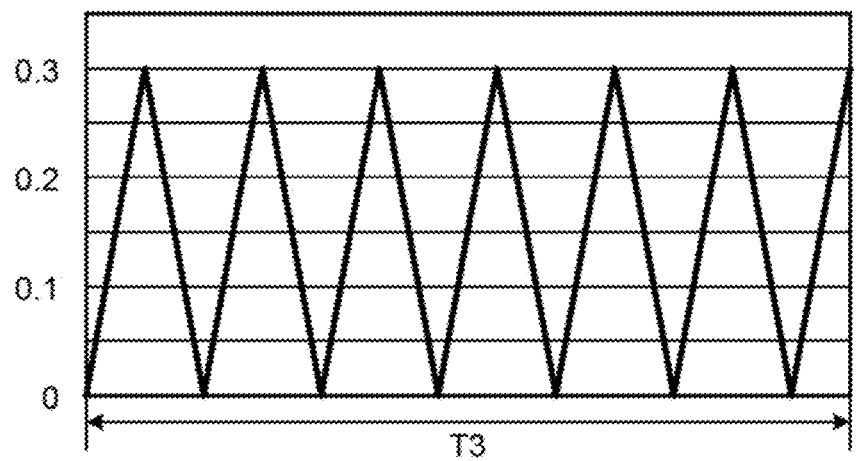
FIG. 29 is a diagram illustrating the waveform of the vibration command directed to the superimposition shaft corresponding to the machining program of FIG. 26.
Figure 30:
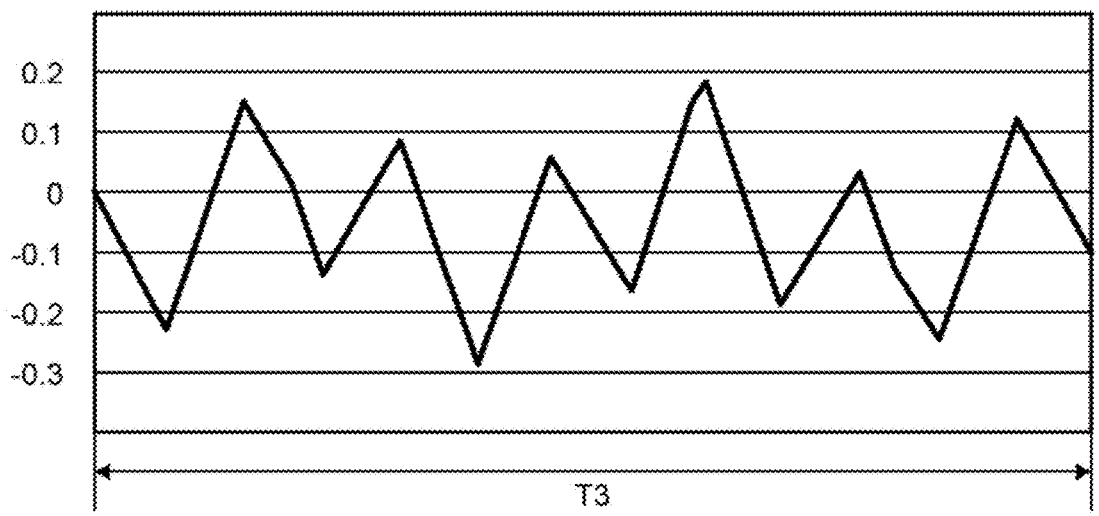
FIG. 30 is a diagram illustrating the waveform of the vibration command directed to the superimposition shaft calculated from the waveforms of FIGS. 28 and 29.

FIG. 28 is a diagram illustrating the waveform of the vibration command directed to the reference shaft corresponding to the machining program of FIG. 26. FIG. 29 is a diagram illustrating the waveform of the vibration command directed to the superimposition shaft corresponding to the machining program of FIG. 26. FIG. 30 is a diagram illustrating the waveform of the vibration command directed to the superimposition shaft calculated from the waveforms of FIGS. 28 and 29. The horizontal axis of the graphs illustrated in FIGS. 28 and 29 is the rotation angle of the main shaft 60, and a time T3 is the time required for the main shaft 60 to make one rotation. The vertical axis of the graph illustrated in FIG. 28 is the position of the reference shaft 62A in the Z1-axis direction, and the vertical axis of the graphs illustrated in FIGS. 29 and 30 is the position of the superimposition shaft 61B in the Z2-axis direction.

In the machining program 821A, the reference shaft 62A has a vibration rate of 2.5 and an amplitude of 0.2 mm. Therefore, as illustrated in FIG. 28, the waveform of the vibration command directed to the reference shaft 62A indicates that the vibration rate is 2.5 and the amplitude is 0.2 mm.

In the machining program 821B, the superimposition shaft 61B has a vibration rate of 4.5 and an amplitude of 0.3 mm. Therefore, as illustrated in FIG. 29, the waveform of the vibration command directed to the superimposition shaft 61B indicates that the vibration rate is 4.5 and the amplitude is 0.3 mm.

The waveform illustrated in FIG. 30 is the waveform of (vibration command directed to the reference shaft 62A)– (vibration command directed to the superimposition shaft 61). That is, the waveform illustrated in FIG. 30 is obtained by subtracting the waveform having a vibration rate of 4.5 and an amplitude of 0.3 mm from the waveform having a vibration rate of 2.5 and an amplitude of 0.2 mm.

As described above, according to the second embodiment, an effect similar to that of the first embodiment can be obtained in a one-spindle two-post lathe. That is, the numerical control device 1 can cause the reference shaft 62A and the superimposition shaft 61B to execute desired low-frequency vibration cutting even when superimposition control is performed.

Third Embodiment

Next, the third embodiment of the present invention will be described with reference to FIGS. 31 to 34. In the third embodiment, superimposition control and low-frequency vibration cutting control are performed on a two-spindle one-post lathe.

Figure 31:
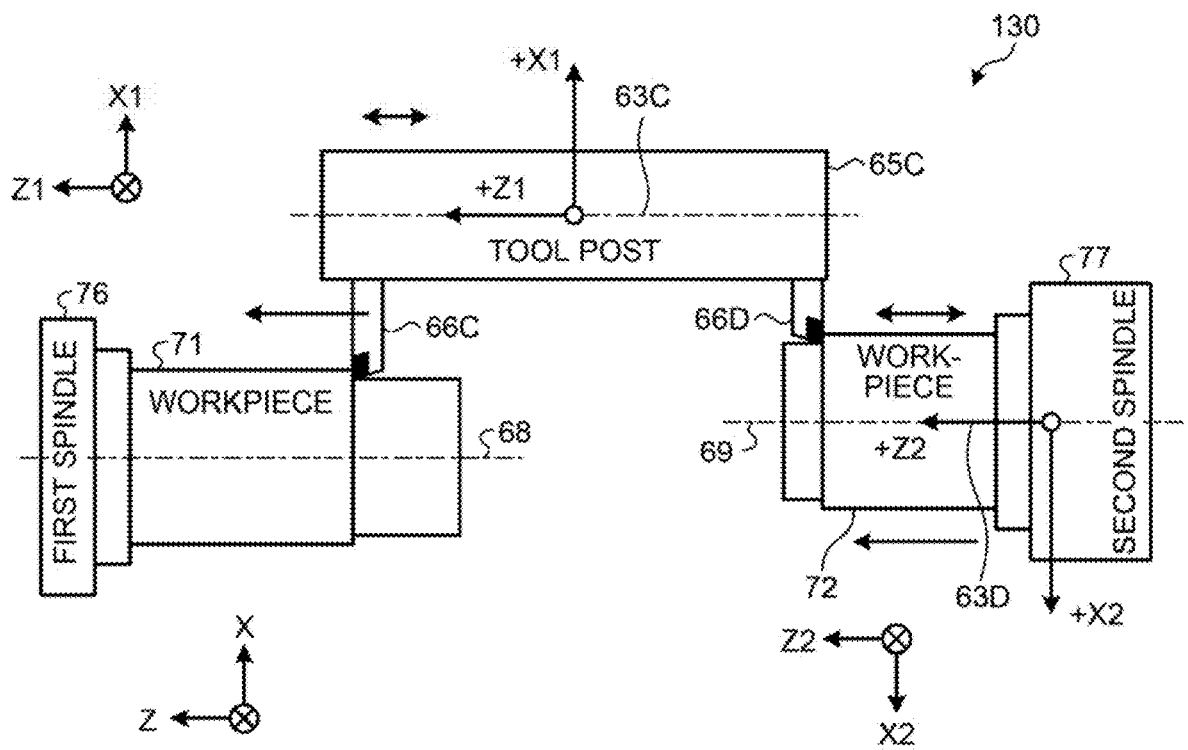
FIG. 31 is a diagram illustrating a configuration of a machine tool according to a third embodiment.

FIG. 31 is a diagram illustrating a configuration of a machine tool according to the third embodiment. In FIG. 31, similarly to FIG. 2, the horizontal direction on the sheet of FIG. 31 is the Z-axis direction, and the vertical direction on the sheet of FIG. 31 is the X-axis direction. Components illustrated in FIG. 31 that achieve the same functions as those of the machine tool 110 of the first embodiment illustrated in FIG. 2 are denoted by the same reference signs, and duplicate descriptions are omitted. The machining target in the present embodiment is workpieces 71 and 72.

The machine tool 130 according to the third embodiment is a two-spindle one-post lathe. A two-spindle one-post lathe is a lathe equipped with two main shafts and a single tool post. An example of the machine tool 130 is a turret lathe. In the machine tool 130, the rotation axis of the workpiece 71 provided by a first spindle 76 is a first main shaft 68, and the rotation axis of the workpiece 72 provided by a second spindle 77 is a second main shaft 69.

The machine tool 130 includes a tool post 65C, and a reference shaft 63C is provided on the tool post 65C. The tool post 65C is movable in the X1-axis direction and the Z1-axis direction.

The workpiece 72 is movable in the X2-axis direction and the Z2-axis direction. Note that although the positive direction of the Z2-axis of FIG. 31 is opposite to that of the Z2-axis depicted in FIG. 2, the Z2-axis may take any positive direction aligned with the rotation axis. In the machine tool 130, the Z1 axis is the reference shaft 63C and the Z2 axis is a superimposition shaft 63D. Note that in the machine tool 130, the first main shaft 68 may be the superimposition shaft 63D that is the Z2 axis.

The tool post 65C is a swivel tool post similar to the tool post 65A. The tool post 65C differs from the tool post 65A in that the tool post 65C can use two tools 66C and 66D simultaneously. The tool 66C cuts the workpiece 71, and the tool 66D cuts the workpiece 72.

In the machine tool 130, the first spindle 76 rotates the workpiece 71 on the first main shaft 68, and the second spindle 77 rotates the workpiece 72 on the second main shaft 69. Then, in the machine tool 130, the tool post 65C vibrates the tools 66C and 66D in the Z1-axis direction, and the workpiece 72 is vibrated in the Z2-axis direction. As a result, the tool 66C performs vibration cutting on the workpiece 71, and the tool 66D performs vibration cutting on the workpiece 72.

Vibration constraint conditions for the machine tool 130 are (L3-1) to (L3-3) below.

(L3-1) The main shaft rotation speeds during vibration cutting may be different for the reference shaft 63C and the superimposition shaft 63D. However, both the reference shaft 63C and the superimposition shaft 63D must operate at main shaft rotation speeds synchronized with the vibration rate.

(L3-2) The vibration rates of the tools 66C and 66D during one rotation of the first main shaft 68 must be the same for the reference shaft 63C and the superimposition shaft 63D.

(L3-3) The vibration amplitudes may be different for the reference shaft 63C and the superimposition shaft 63D. However, a command for the vibration of the superimposition shaft 63D must be made in consideration of the vibration of the reference shaft 63C.

The reason why (L3-2) specifies that the vibration rates must be the same for the reference shaft 63C and the superimposition shaft 63D is that the vibration of the reference shaft 63C is transmitted to the superimposition shaft 63D in the machine tool 130 because the tool post 65C holds the two tools 66C and 66D. In the machine tool 130, if the vibration rates are not the same for the reference shaft 63C and the superimposition shaft 63D, the vibration of the superimposition shaft 63D does not have a fixed-shape wave such as a sine wave or a triangular wave.

The reason why (L3-3) specifies that the command for the vibration of the superimposition shaft 63D must be made in consideration of the vibration of the reference shaft 63C is that the vibration of the reference shaft 63C is transmitted to the superimposition shaft 63D in the machine tool 130 because the tool post 65C holds the two tools 66C and 66D.

FIG. 32 is a diagram illustrating an example of a machining program for use in the numerical control device according to the third embodiment. Some commands of the machining program 83 are the same as those of the machining program 81 described with reference to FIG. 3 of the first embodiment, and the description thereof will be omitted.

The machining program 83 is used when the numerical control device 1 controls the machine tool 130. Therefore, the machining program 83 includes a machining program 830C for the reference shaft 63C and a machining program 830D for the superimposition shaft 63D.

G165 in the machining program 830C is a command to vibrate the tool post 65C in the Z1-axis direction, and G165 in the machining program 830D is a command to vibrate the workpiece 72 in the Z2-axis direction. In a case where G165 is used in the machining program 830C, the tools 66C and 66D are vibrated in the Z1-axis direction at the amplitude and vibration rate specified by G165. The illustrated example indicates that the tools 66C and 66D are vibrated at an amplitude of 0.2 mm and a vibration rate of 2.5. In a case where G165 is used in the machining program 830D, the workpiece 72 is vibrated in the Z2-axis direction at the amplitude and vibration rate specified by G165. The illustrated example indicates that the workpiece 72 is vibrated at an amplitude of 0.3 mm and a vibration rate of 4.5.

In the machining program 830C, M3 S1=2000 indicates that the first main shaft rotation speed command directed to the first main shaft 68 is 2000 rotations. In the machining program 830D, M3 S2=1200 indicates that the second main shaft rotation speed command directed to the second main shaft 69 is 1200 rotations. In the following description, the main shaft rotation speed of the first main shaft 68 is referred to as a first main shaft rotation speed, and the main shaft rotation speed of the second main shaft 69 is referred to as a second main shaft rotation speed.

In a case where the machining program 83 is used, the vibration calculation unit uses any of the following methods (M3-1) to (M3-3) to calculate a vibration rate and a main shaft rotation speed that define a changed vibration rate and a changed main shaft rotation speed. As a result, each axis is controlled by the changed vibration rate and the changed main shaft rotation speed.

(M3-1) Match the Vibration Rate of the Superimposition Shaft 63D to the Vibration Rate of the Reference Shaft 63C.

In this case, the vibration calculation unit 22B changes the vibration rate of the superimposition shaft 63D from D=4.5 to D=2.5 that is the vibration rate of the reference shaft 63C. The vibration calculation unit 22A calculates, from D=2.5 that is the vibration rate of the reference shaft 63C and S1=2000 S1=2000 that is the rotation speed command directed to the first main shaft 68, a first main shaft rotation speed that can synchronize with the vibration rate of the reference shaft 63C and the superimposition shaft 63D. The vibration calculation unit 22A calculates the first main shaft rotation speed, using information in the numerical control device 1. The first main shaft rotation speed calculated by the vibration calculation unit 22A is the actual first main shaft rotation speed of the first main shaft 68. In a case where a plurality of candidates for the first main shaft rotation speed are available, the vibration calculation unit 22A employs one close to the initial main shaft rotation speed of 2000 (times/min). For example, the first main shaft rotation speed calculated by the vibration calculation unit 22A can be 1929 (times/min).

Further, the vibration calculation unit 22B calculates, from D=2.5 set as the vibration rate of the superimposition shaft 63D and S2=1200 that is the rotation speed command directed to the second main shaft 69, a second main shaft rotation speed that can synchronize with the vibration rate of the superimposition shaft 63D. The vibration calculation unit 22B calculates the second main shaft rotation speed, using information in the numerical control device 1. The second main shaft rotation speed calculated by the vibration calculation unit 22B is the second main shaft rotation speed of the second main shaft 69 for the actual vibration cutting. In a case where a plurality of candidates for the second main shaft rotation speed are available, the vibration calculation unit 22B employs one close to the initial main shaft rotation speed of 1200 (times/min). For example, the second main shaft rotation speed calculated by the vibration calculation unit 22B can be 1227 (times/min).

(M3-2) Match the Vibration Rate of the Reference Shaft 63C to the Vibration Rate of the Superimposition Shaft 63D.

In this case, the vibration calculation unit 22A changes the vibration rate of the reference shaft 63C from D=2.5 to D=4.5 that is the vibration rate of the superimposition shaft 63D. After that, the vibration calculation unit 22A calculates a first main shaft rotation speed, using a method similar to (M2-2) For example, the first main shaft rotation speed calculated by the vibration calculation unit 22A can be 1875 (times/min).

The vibration calculation unit 22B calculates, from D=4.5 set as the vibration rate of the superimposition shaft 63D and S2=1200 that is the rotation speed command directed to the second main shaft 69, a second main shaft rotation speed that can synchronize with the vibration rate of the superimposition shaft 63D. The vibration calculation unit 22B calculates a second main shaft rotation speed, using a method similar to (M2-3). For example, the second main shaft rotation speed calculated by the vibration calculation unit 22B can be 1250 (times/min).

(M3-3) Average the Vibration Rate of the Reference Shaft 63C and the Vibration Rate of the Superimposition Shaft 63D.

The average of the vibration rate of the reference shaft 63C and the vibration rate of the superimposition shaft 63D may be calculated by either the vibration calculation unit 22A or the vibration calculation unit 22B. In the following description, the average of the vibration rate of the reference shaft 63C and the vibration rate of the superimposition shaft 63D is calculated by the vibration calculation unit 22A.

The vibration calculation unit 22A calculates an average rate by taking the average of D=2.5 and D=4.5. D=2.5 is the vibration rate of the reference shaft 63C, and D=4.5 is the vibration rate of the superimposition shaft 63D. The resultant average rate is 3.5. The vibration calculation unit 22A sets the calculation result as the vibration rate of the reference shaft 63C and the vibration rate of the superimposition shaft 63D.

The vibration calculation unit 22A also calculates a first main shaft rotation speed that can synchronize with the calculated average rate of 3.5. The vibration calculation unit 22A calculates the first main shaft rotation speed, using information in the numerical control device 1. In a case where a plurality of candidates for the first main shaft rotation speed are available, the vibration calculation unit 22A employs one close to the initial first main shaft rotation speed of 2000 (times/min). For example, the main shaft rotation speed calculated by the vibration calculation unit 22A can be 1929 (times/min).

The vibration calculation unit 22B calculates a second main shaft rotation speed that can synchronize with the calculated average rate of 3.5. The vibration calculation unit 22B calculates the second main shaft rotation speed, using information in the numerical control device 1. In a case where a plurality of candidates for the second main shaft rotation speed are available, the vibration calculation unit 22B employs one close to the initial second main shaft rotation speed of 1200 (times/min). For example, the main shaft rotation speed calculated by the vibration calculation unit 22B can be 1205 (times/min).

Next, a procedure for controlling the machine tool 130 will be described. FIG. 33 is a flowchart illustrating a procedure for a first control process by the numerical control device according to the third embodiment. FIG. 33 represents a procedure for controlling the machine tool 130 by the numerical control device 1. The first control process of FIG. 33 is a control process for matching the vibration rate of the superimposition shaft 63D to the vibration rate of the reference shaft 63C.

Because steps S610 to S620 in FIG. 33 are the same as steps S110 to S120 in FIG. 4, the description thereof will be omitted. The analysis processing unit 37 sends the analysis result such as vibration conditions to the interpolation processing unit 38.

The vibration calculation units 22A and 22B execute steps S630 to S640, using the above-described method (M3-1). That is, the vibration calculation unit 22B matches the vibration rate of the superimposition shaft 63D to the vibration rate of the reference shaft 63C (step S630). Then, on the basis of the vibration rate obtained in step S630 and the initial first main shaft rotation speed, the vibration calculation unit 22A calculates a first main shaft rotation speed that can synchronize with the vibration rate of the reference shaft 63C and the superimposition shaft 63D (step S640).

Then, on the basis of the vibration rate obtained in step S630 and the initial second main shaft rotation speed, the vibration calculation unit 22B calculates a second main shaft rotation speed that can synchronize with the vibration rate of the superimposition shaft 63D (step S650). Note that the vibration calculation units 22A and 22B may calculate the vibration rate of the reference shaft 63C and the vibration rate of the superimposition shaft 63D, using the above-described process (M3-2).

After that, a process similar to the process described with reference to the flowchart of FIG. 4 is executed, such that the vibration generation unit 24A generates a reference vibration waveform, and the vibration generation unit 24B generates a superimposition vibration waveform. Then, a process similar to step S170 of FIG. 4 is executed, such that the axis data output unit 40 outputs the main shaft rotation speeds and speed commands to the drive unit 90 (step S660).

As a result, the vibration operation of the Z1 axis is controlled in accordance with the vibration rate of the reference shaft 63C calculated and set by the vibration calculation unit 22A where the method (M3-1) or (M3-2) is used. The rotation of the first main shaft 68 is controlled in accordance with the first main shaft rotation speed calculated by the vibration calculation unit 22A. The vibration operation of the Z2 axis is controlled in accordance with the vibration rate of the superimposition shaft 63D calculated and set by the vibration calculation unit 22B. The rotation of the second main shaft 69 is controlled in accordance with the second main shaft rotation speed calculated by the vibration calculation unit 22B.

Specifically, the first spindle 76 rotates the workpiece 71 at the first main shaft rotation speed calculated by the vibration calculation unit 22A, and the tool post 65C vibrates the tools 66C and 66D at the vibration rate calculated by the vibration calculation unit 22A. In addition, the second spindle 77 rotates the workpiece 72 at the second main shaft rotation speed calculated by the vibration calculation unit 22B, and the workpiece 72 is vibrated at the vibration rate calculated by the vibration calculation unit 22B.

Note that, in step S630, the vibration calculation units 22A and 22B may average the vibration rate of the reference shaft 63C and the vibration rate of the superimposition shaft 63D using the above-described process (M3-3). The procedure therefor will be described.

FIG. 34 is a flowchart illustrating a procedure for a second control process by the numerical control device according to the third embodiment. The second control process of FIG. 34 is a control process for setting the average of the vibration rate of the superimposition shaft 63D and the vibration rate of the reference shaft 63C to the superimposition shaft 63D and the reference shaft 63C. Because steps S710 to S720 in FIG. 34 are the same as steps S110 to S120 in FIG. 4, the description thereof will be omitted. The analysis processing unit 37 sends the analysis result such as vibration conditions to the interpolation processing unit 38.

The vibration calculation units 22A and 22B execute steps S730 to S740, using the above-described process (M3-3). That is, the vibration calculation unit 22B calculates an average vibration rate by taking the average of the vibration rate of the reference shaft 63C and the vibration rate of the superimposition shaft 63D (step S730). After that, the vibration calculation units 22A and 22B execute steps S740 and S750.

Step S740 that is executed by the vibration calculation unit 22A is similar to step S640 in FIG. 33. The vibration calculation unit 22A in step S640 calculates a first main shaft rotation speed, using the vibration rate obtained in step S630, whereas the vibration calculation unit 22A in step S740 calculates a first main shaft rotation speed, using the average vibration rate obtained in step S730.

Step S750 that is executed by the vibration calculation unit 22B is similar to step S650 in FIG. 33. The vibration calculation unit 22B in step S650 calculates a second main shaft rotation speed, using the vibration rate obtained in step S630, whereas the vibration calculation unit 22A in step S750 calculates a second main shaft rotation speed, using the average vibration rate obtained in step S730.

After that, a process similar to the process described with reference to the flowchart of FIG. 4 is executed, such that the vibration generation unit 24A generates a reference vibration waveform, and the vibration generation unit 24B generates a superimposition vibration waveform. Then, a process similar to step S170 of FIG. 4 is executed, such that the axis data output unit 40 outputs the main shaft rotation speeds and speed commands to the drive unit 90 (step S760).

As a result, using the method (M3-3), the Z1 axis, the Z2 axis, the first main shaft 68, and the second main shaft 69 are controlled in the same manner as when using the method (M3-1) or (M3-2).

In some case, the machining program 83 may contain only a vibration command for the reference shaft 63C, without containing vibration commands directed to the superimposition shaft 63D. Alternatively, the machining program 83 may contain only a vibration command directed to the superimposition shaft 63D, without containing vibration commands directed to the reference shaft 63C. In these cases, the numerical control device 1 performs a process similar to that described with reference to FIG. 5 or 6 of the first embodiment.

Note that the vibration calculation units 22A and 22B may execute all the processes (M3-1) to (M3-3) in steps S630 and S730. In this case, the vibration calculation units 22A and 22B select, from among the calculation results of (M3-1) to (M3-3), the main shaft rotation speed having a small difference from the initial main shaft rotation speed.

Which of (M3-1) to (M3-3) should be employed may be set in advance in the numerical control device 1, or the user may select which of (M3-1) to (M3-3) should be employed. The vibration calculation units 22A and 22B may select (M3-1) or (M3-2) in accordance with the side that executes a G165 command first. That is, in a case where a G165 command is executed on the reference shaft 63C first, the vibration calculation units 22A and 22B apply (M3-1), and in a case where a G165 command is executed on the superimposition shaft 63D first, the vibration calculation units 22A and 22B apply (M3-2).

As described above, according to the third embodiment, an effect similar to that of the first embodiment can be obtained in a two-spindle one-post lathe. That is, the numerical control device 1 can cause the reference shaft 63C and the superimposition shaft 63D to execute desired low-frequency vibration cutting even when superimposition control is performed.

Here, the hardware configuration of the control computation unit 2 included in the numerical control device 1 will be described. FIG. 35 is a diagram illustrating an exemplary hardware configuration of the control computation unit according to any of the first to third embodiments.

The control computation unit 2 can be implemented by a control circuit 300 illustrated in FIG. 35, that is, a processor 301 and a memory 302. The processor 301 is exemplified by a central processing unit (CPU, also referred to as a central processing device, a processing device, a computation device, a microprocessor, a microcomputer, a processor, or a DSP), or a system large scale integration (LSI). The memory 302 is exemplified by a random access memory (RAN) or a read only memory (ROM).

The control computation unit 2 is implemented by the processor 301 reading and executing a program stored in the memory 302 for executing the operation of the control computation unit 2. It can also be said that this program causes the computer to execute the procedure or method for the control computation unit 2. The memory 302 is also used as a temporary memory when the processor 301 performs various processes.

The program executed by the processor 301 may be a computer program product having a computer-readable non-transitory recording medium including a plurality of computer-executable instructions for performing data processing. The program executed by the processor 301 causes the computer to execute the data processing with the plurality of instructions.

Alternatively, the control computation unit 2 may be implemented by dedicated hardware. Note that some of the functions of the control computation unit 2 may be implemented by dedicated hardware, and the other functions may be implemented by software or firmware.

The implementation content described with reference to FIGS. 26 to 30 of the second embodiment may be applied to the first embodiment or the third embodiment.

The configurations described in the above-mentioned embodiments indicate examples of the contents of the present invention. The configurations can be combined with another well-known technique, and some of the configurations can be omitted or changed in a range not departing from the gist of the present invention.

REFERENCE SIGNS LIST

1 numerical control device; 2 control computation unit; 3 input interface unit; 4 display unit; 5 PLC interface unit; 11A, 11B vibration command analysis unit; 21A reference shaft interpolation unit; 21B superimposition shaft interpolation unit; 22A, 22B vibration calculation unit; 23B difference calculation unit; 24A, 24B vibration generation unit; 25A, 25B vibration check unit; 26A, 26B movement amount generation unit; 27 combining unit; 28 superimposition combining unit; 34 storage unit; 37 analysis processing unit; 38 interpolation processing unit; 51a to 51c, 52a to 52g, 53a, 53b, 54a to 54c movement path; 60 main shaft; 61A, 62A, 63C reference shaft; 61B, 63D superimposition shaft; 65A, 65B, 65C tool post; 66A, 66B, 66C, 66D tool; 68 first main shaft; 69 second main shaft; 70 to 72 workpiece; 75, 76 first spindle; 77 second spindle; 81, 82P, 82Q, 83 machining program; 90 drive unit; 110, 120, 130 machine tool; P1a, P1b, P2a, P2b command amplitude; P1c, P2c difference amplitude.

The invention claimed is:

1. A numerical control device for a machine tool, the machine tool including: a first drive shaft to move a first tool or a machining target, the first tool performing a first machining process; and a second drive shaft to move a second tool or the machining target, the second tool performing a second machining process, the numerical control device controlling the first drive shaft and the second drive shaft such that a movement of the second drive shaft is superimposed on a movement of the first drive shaft to allow the second machining process to be executed relative to the first machining process, the numerical control device comprising a control computer to, in response to a superimposition control command to superimpose the movement of the second drive shaft on the movement of the first drive shaft, perform control on the first drive shaft, the second drive shaft, and a main shaft by changing at least one of a first vibration rate, a second vibration rate and a main shaft rotation speed on a basis of a first vibration command, a second vibration command and a main shaft rotation speed command such that the first vibration rate stays constant and the second vibration rate stays constant, and changing a second amplitude such that the second drive shaft is vibrated with a third amplitude, the second amplitude being included in the second vibration command and being for vibrating the second drive shaft, the third amplitude being based on a difference obtained by subtracting a first amplitude from the second amplitude, the first amplitude being included in the first vibration command and being for vibrating the first drive shaft, the main shaft being a rotation axis of the machining target, the first vibration rate being the number of times that the first drive shaft vibrates per rotation of the main shaft, the second vibration rate being the number of times that the second drive shaft vibrates per rotation of the main shaft, the first vibration command being to vibrate the first drive shaft, the second vibration command being to vibrate the second drive shaft, the main shaft rotation speed command being directed to the main shaft, the main shaft rotation speed command being a command on the main shaft rotation speed per unit time.

2. The numerical control device according to claim 1, wherein in a case where the machine tool including the first drive shaft and the second drive shaft is a lathe equipped with a single main shaft and two tool posts, one of the two tool posts having the first drive shaft, another one of the two tool posts having the second drive shaft, the control computer changes the main shaft rotation speed such that one of the first vibration rate and the second vibration rate stays constant, and changes another one of the first vibration rate and the second vibration rate such that the another one stays constant with respect to the changed main shaft rotation speed.

3. The numerical control device according to claim 1, wherein in a case where the machine tool including the first drive shaft and the second drive shaft is a lathe equipped with a single main shaft and two tool posts, one of the two tool posts having the first drive shaft, another one of the two tool posts having the second drive shaft, the control computer changes the first vibration rate and the second vibration rate to an average rate of the first vibration rate and the second vibration rate, and changes the main shaft rotation speed such that the average rate stays constant per rotation of the main shaft.

4. The numerical control device according to claim 1, wherein in a case where the machine tool including the first drive shaft and the second drive shaft is a lathe equipped with a single main shaft and two tool posts, the main shaft defining the first drive shaft, one of the two tool posts having the second drive shaft, the control unit computer makes the first and second vibration rates same by: changing the first vibration rate to the second vibration rate; changing the second vibration rate to the first vibration rate; or changing the first vibration rate and the second vibration rate to an average rate of the first vibration rate and the second vibration rate, and changes the main shaft rotation speed such that the same rate stays constant per rotation of the main shaft.

5. The numerical control device according to claim 1, wherein in a case where the machine tool including the first drive shaft and the second drive shaft is a lathe equipped with a first main shaft, a second main shaft, and a single tool post, the tool post having the first drive shaft, the second main shaft defining the second drive shaft, the control computer makes the first and second vibration rates same by: changing the first vibration rate to the second vibration rate; changing the second vibration rate to the first vibration rate; or changing the first vibration rate and the second vibration rate to an average rate of the first vibration rate and the second vibration rate, the control computer changing a main shaft rotation speed of the first main shaft such that the same rate stays constant per rotation of the first main shaft, the control computer changing a main shaft rotation speed of the second main shaft such that the same rate stays constant per rotation of the second main shaft.

6. The numerical control device according to claim 1, wherein the control computer controls the first drive shaft, using the second vibration command in absence of the first vibration command, and the control computer controls the second drive shaft, using the first vibration command in absence of the second vibration command.

7. The numerical control device according to claim 6, wherein the control computer includes:

a first vibration checker to check whether there is the second vibration command in the machining program; and a second vibration checker to check whether there is the first vibration command in the machining program, the control computer controls the second drive shaft using the first vibration command when the first vibration checker determines that there is not the second vibration command, and the control computer controls the first drive shaft using the second vibration command when the second vibration checker determines that there is not the first vibration command.

8. The numerical control device according to claim 1, wherein the control computer changes at least one of the first vibration rate, the second vibration rate, and the main shaft rotation speed in compliance with a constraint condition for implementing vibration cutting using the first drive shaft and the second drive shaft and implementing superimposition control using the first drive shaft and the second drive shaft.

9. A numerical control method for a machine tool, the machine tool including: a first drive shaft to move a first tool or a machining target, the first tool performing a first machining process; and a second drive shaft to move a second tool or the machining target, the second tool performing a second machining process, the numerical control method being for controlling the first drive shaft and the second drive shaft such that a movement of the second drive shaft is superimposed on a movement of the first drive shaft to allow the second machining process to be executed relative to the first machining process, the numerical control method comprising in response to a superimposition control command to superimpose the movement of the second drive shaft on the movement of the first drive shaft, performing control on the first drive shaft, the second drive shaft, and a main shaft by changing at least one of a first vibration rate, a second vibration rate and a main shaft rotation speed on a basis of a first vibration command, a second vibration command and a main shaft rotation speed command such that the first vibration rate stays constant and the second vibration rate stays constant, and changing a second amplitude such that the second drive shaft is vibrated with a third amplitude, the second amplitude being included in the second vibration command and being for vibrating the second drive shaft, the third amplitude being based on a difference obtained by subtracting a first amplitude from the second amplitude, the first amplitude being included in the first vibration command and being for vibrating the first drive shaft, the main shaft being a rotation axis of the machining target, the first vibration rate being the number of times that the first drive shaft vibrates per rotation of the main shaft, the second vibration rate being the number of times that the second drive shaft vibrates per rotation of the main shaft, the first vibration command being to vibrate the first drive shaft, the second vibration command being to vibrate the second drive shaft, the main shaft rotation speed command being directed to the main shaft, the main shaft rotation speed command being a command on the main shaft rotation speed per unit time.

10. The numerical control method according to claim 9, wherein performing control on the first drive shaft, the second drive shaft, and the main shaft includes changing at least one of the first vibration rate, the second vibration rate, and the main shaft rotation speed in compliance with a constraint condition for implementing vibration cutting using the first drive shaft and the second drive shaft and superimposition control using the first drive shaft and the second drive shaft.

* * * * *